United States Patent
Lutich et al.

(10) Patent No.: US 12,002,192 B2
(45) Date of Patent: Jun. 4, 2024

(54) TRANSFER OF DAMAGE MARKERS FROM IMAGES TO 3D VEHICLE MODELS FOR DAMAGE ASSESSMENT

(71) Applicant: Solera Holdings, LLC, Westlake, TX (US)

(72) Inventors: Andrey Lutich, Dresden (DE); Mihran Shahinian, Austin, TX (US)

(73) Assignee: Solera Holdings, LLC, Westlake, TX (US)

( * ) Notice: Subject to any disclaimer, the term of this patent is extended or adjusted under 35 U.S.C. 154(b) by 345 days.

(21) Appl. No.: 17/455,056

(22) Filed: Nov. 16, 2021

(65) Prior Publication Data

US 2023/0153975 A1  May 18, 2023

(51) Int. Cl.
*G06T 7/00* (2017.01)
*G06N 20/00* (2019.01)
(Continued)

(52) U.S. Cl.
CPC .......... *G06T 7/0004* (2013.01); *G06N 20/00* (2019.01); *G06Q 30/0283* (2013.01); *G06T 3/18* (2024.01);
(Continued)

(58) Field of Classification Search
CPC .......... G06T 7/0004; G06T 3/18; G06T 7/10; G06T 7/70; G06T 17/00; G06T 2200/24;
(Continued)

(56) References Cited

U.S. PATENT DOCUMENTS 7,912,740 B2    3/2011   Vahidi et al.
9,721,304 B1    8/2017   Parchment et al.
(Continued)

FOREIGN PATENT DOCUMENTS

KR   10-2109882 B1    5/2020
WO   2017055878 A1    4/2017
WO   2018191421 A1    10/2018

OTHER PUBLICATIONS

International Search Report and Written Opinion of the International Searching Authority dated Feb. 2, 2023 in connection with International Patent Application No. PCT/US2022/079328, 17 pages.
(Continued)

*Primary Examiner* — Michael S Osinski

(57) ABSTRACT

A method includes obtaining an image of a damaged vehicle and a three-dimensional (3D) vehicle model associated with the damaged vehicle. The method also includes identifying one or more damage markers that indicate damage to the damaged vehicle based on the image. The method further includes identifying a pose of the damaged vehicle within the image. In addition, the method includes mapping the one or more damage markers onto the 3D vehicle model based on the identified pose, where the one or more mapped damage markers identify one or more locations and dimensions of the damage to the damaged vehicle on the 3D vehicle model. In some cases, one or more trained machine learning models may be used to identify the one or more damage markers, identify the pose of the damaged vehicle within the image, and/or map the one or more damage markers onto the 3D vehicle model.

20 Claims, 9 Drawing Sheets

(51) Int. Cl.
*G06Q 30/0283* (2023.01)
*G06T 3/18* (2024.01)
*G06T 7/10* (2017.01)
*G06T 7/70* (2017.01)
*G06T 17/00* (2006.01)

(52) U.S. Cl.
CPC ............... *G06T 7/10* (2017.01); *G06T 7/70* (2017.01); *G06T 17/00* (2013.01); *G06T 2200/24* (2013.01); *G06T 2207/20081* (2013.01); *G06T 2207/30204* (2013.01); *G06T 2207/30252* (2013.01)

(58) Field of Classification Search
CPC . G06T 2207/20081; G06T 2207/30204; G06T 2207/30252; G06T 7/001; G06T 7/75; G06T 2207/20084; G06T 7/0002; G06T 2207/30248; G06T 2207/30156; G06T 7/11; G06N 20/00; G06N 3/045; G06N 3/0464; G06N 3/091; G06N 3/08; G06N 3/044; G06N 7/01; G06Q 30/0283; G06Q 40/08; G06Q 10/20; G06V 20/20; G06V 2201/08; G06V 10/764; G06V 10/82
See application file for complete search history.

(56) References Cited

U.S. PATENT DOCUMENTS

| | | | |
|---|---|---|---|
| 9,824,453 B1 | 11/2017 | Collins et al. | |
| 10,319,094 B1* | 6/2019 | Chen | G06N 3/08 |
| 10,373,260 B1* | 8/2019 | Haller, Jr. | G06Q 40/08 |
| 10,430,886 B1 | 10/2019 | Brandmaier et al. | |
| 10,507,550 B2* | 12/2019 | Arimoto | G06V 10/44 |
| 10,825,097 B1* | 11/2020 | Knuffman | G06T 7/0004 |
| 11,043,000 B2* | 6/2021 | Zhong | G06T 3/00 |
| 11,080,839 B2* | 8/2021 | Xu | G06F 18/2413 |
| 11,106,926 B2* | 8/2021 | Lambert | G06Q 40/08 |
| 11,120,574 B1* | 9/2021 | Tomlinson | G06T 7/75 |
| 11,144,889 B2* | 10/2021 | Li | G06T 7/001 |
| 11,328,483 B2* | 5/2022 | Charvat | G06T 7/0002 |
| 11,341,746 B2* | 5/2022 | Guo | G06F 18/22 |
| 11,361,428 B1* | 6/2022 | Chen | G06Q 40/08 |
| 11,392,897 B1* | 7/2022 | Gingrich | G06T 7/55 |
| 11,410,287 B2* | 8/2022 | Tian | G06T 7/0002 |
| 11,721,010 B2* | 8/2023 | Nei | G06Q 10/08 |
| 2013/0317864 A1 | 11/2013 | Tofte et al. | |
| 2014/0316825 A1 | 10/2014 | van Dijk et al. | |
| 2016/0335727 A1* | 11/2016 | Jimenez | G06Q 40/08 |
| 2018/0260793 A1 | 9/2018 | Li et al. | |
| 2018/0350163 A1 | 12/2018 | Pofale et al. | |
| 2019/0147284 A1 | 5/2019 | Gavrilyuk et al. | |
| 2019/0197442 A1 | 6/2019 | Lu | |
| 2020/0005478 A1* | 1/2020 | Zhong | G06Q 30/018 |
| 2020/0104940 A1* | 4/2020 | Krishnan | G06N 3/04 |
| 2020/0111061 A1 | 4/2020 | Stucki et al. | |
| 2020/0111203 A1* | 4/2020 | Tan | G06V 10/806 |
| 2020/0143212 A1 | 5/2020 | Okazaki | |
| 2020/0349370 A1* | 11/2020 | Lambert | G06V 20/20 |
| 2020/0357111 A1* | 11/2020 | Wang | G06T 7/0002 |
| 2021/0133501 A1 | 5/2021 | Xu | |
| 2021/0142464 A1* | 5/2021 | Tian | G06T 7/0004 |
| 2021/0150691 A1* | 5/2021 | Xu | G06T 7/0004 |
| 2021/0174493 A1* | 6/2021 | Xu | G06N 3/045 |
| 2021/0241439 A1 | 8/2021 | Lutich et al. | |
| 2021/0342997 A1* | 11/2021 | Malreddy | G06T 7/70 |
| 2022/0036132 A1* | 2/2022 | Oruganty | G06N 3/045 |
| 2022/0068007 A1* | 3/2022 | Lafer | G06T 7/50 |
| 2022/0148050 A1* | 5/2022 | Gandhi | G06Q 10/20 |
| 2022/0156914 A1* | 5/2022 | Ono | G01N 21/956 |
| 2023/0186563 A1* | 6/2023 | Coffman | G06T 7/0002 345/419 |

OTHER PUBLICATIONS

International Preliminary Report on Patentability for International Patent Application No. PCT/US2019/054274 dated Mar. 23, 2021, 7 pages.

International Search Report and Written Opinion of the International Searching Authority for International Patent Application No. PCT/US2019/054274 dated Dec. 9, 2019, 9 pages.

Cha et al., "Autonomous Structural Visual Inspection Using Region-Based Deep Learning for Detecting Multiple Damage Types," ResearchGate, Nov. 2017, 18 pages.

Chen et al., "DeepLab: Semantic Image Segmentation with Deep Convolutional Nets, Atrous Convolution, and Fully Connected CRFs," https://arxiv.org/abs/1606.00915, 2017, 4 pages.

Karpathy et al., "Deep Visual-Semantic Alignments for Generating Image Descriptions," https://arxiv.org/abs/1412.2306, 2015, 17 pages.

"Scene Parsing," http://sceneparsing.csail.mit.edu, 2017, 5 pages.

Turol, "Automotive Insurance with TensorFlow: Estimating Damage / Repair Costs," Altoros, 2018, 9 pages.

* cited by examiner

TRANSFER OF DAMAGE MARKERS FROM IMAGES TO 3D VEHICLE MODELS FOR DAMAGE ASSESSMENT

TECHNICAL FIELD

This disclosure relates generally to assessment systems. More specifically, this disclosure relates to the transfer of damage markers from images to three-dimensional (3D) vehicle models for damage assessment.

BACKGROUND

Automotive vehicles, recreational vehicles, and other types of vehicles are routinely damaged in accidents or other incidents. For example, a vehicle can be damaged during a collision with another vehicle or with another stationary or moving object. As another example, a vehicle can be damaged during a weather event, such as during a hailstorm or when a tree limb falls on the vehicle. When a vehicle is damaged and needs repair, an appraiser, inspector, or other personnel typically need to inspect the damaged vehicle in order to estimate the cost of repairing the vehicle or to order parts for repairing the vehicle. As particular examples, an insurance adjuster may need to inspect the damaged vehicle in order to handle an insurance claim, or a vehicle repair inspector may need to inspect the damaged vehicle in order to provide an accurate repair estimate and parts list to the vehicle's owner or an insurance company.

SUMMARY

This disclosure relates to the transfer of damage markers from images to three-dimensional (3D) vehicle models for damage assessment.

In a first embodiment, a method includes obtaining an image of a damaged vehicle and a 3D vehicle model associated with the damaged vehicle. The method also includes identifying one or more damage markers that indicate damage to the damaged vehicle based on the image. The method further includes identifying a pose of the damaged vehicle within the image. In addition, the method includes mapping the one or more damage markers onto the 3D vehicle model based on the identified pose, where the one or more mapped damage markers identify one or more locations and dimensions of the damage to the damaged vehicle on the 3D vehicle model.

In a second embodiment, an apparatus includes at least one processing device configured to obtain an image of a damaged vehicle and a 3D vehicle model associated with the damaged vehicle. The at least one processing device is also configured to identify one or more damage markers that indicate damage to the damaged vehicle based on the image. The at least one processing device is further configured to identify a pose of the damaged vehicle within the image. In addition, the at least one processing device is configured to map the one or more damage markers onto the 3D vehicle model based on the identified pose, where the one or more mapped damage markers identify one or more locations and dimensions of the damage to the damaged vehicle on the 3D vehicle model.

In a third embodiment, a non-transitory machine-readable medium contains instructions that when executed cause at least one processor to obtain an image of a damaged vehicle and a 3D vehicle model associated with the damaged vehicle. The medium also contains instructions that when executed cause the at least one processor to identify one or more damage markers that indicate damage to the damaged vehicle based on the image. The medium further contains instructions that when executed cause the at least one processor to identify a pose of the damaged vehicle within the image. In addition, the medium contains instructions that when executed cause the at least one processor to map the one or more damage markers onto the 3D vehicle model based on the identified pose, where the one or more mapped damage markers identify one or more locations and dimensions of the damage to the damaged vehicle on the 3D vehicle model.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which like reference numerals represent like parts.

DETAILED DESCRIPTION

Figure 1:
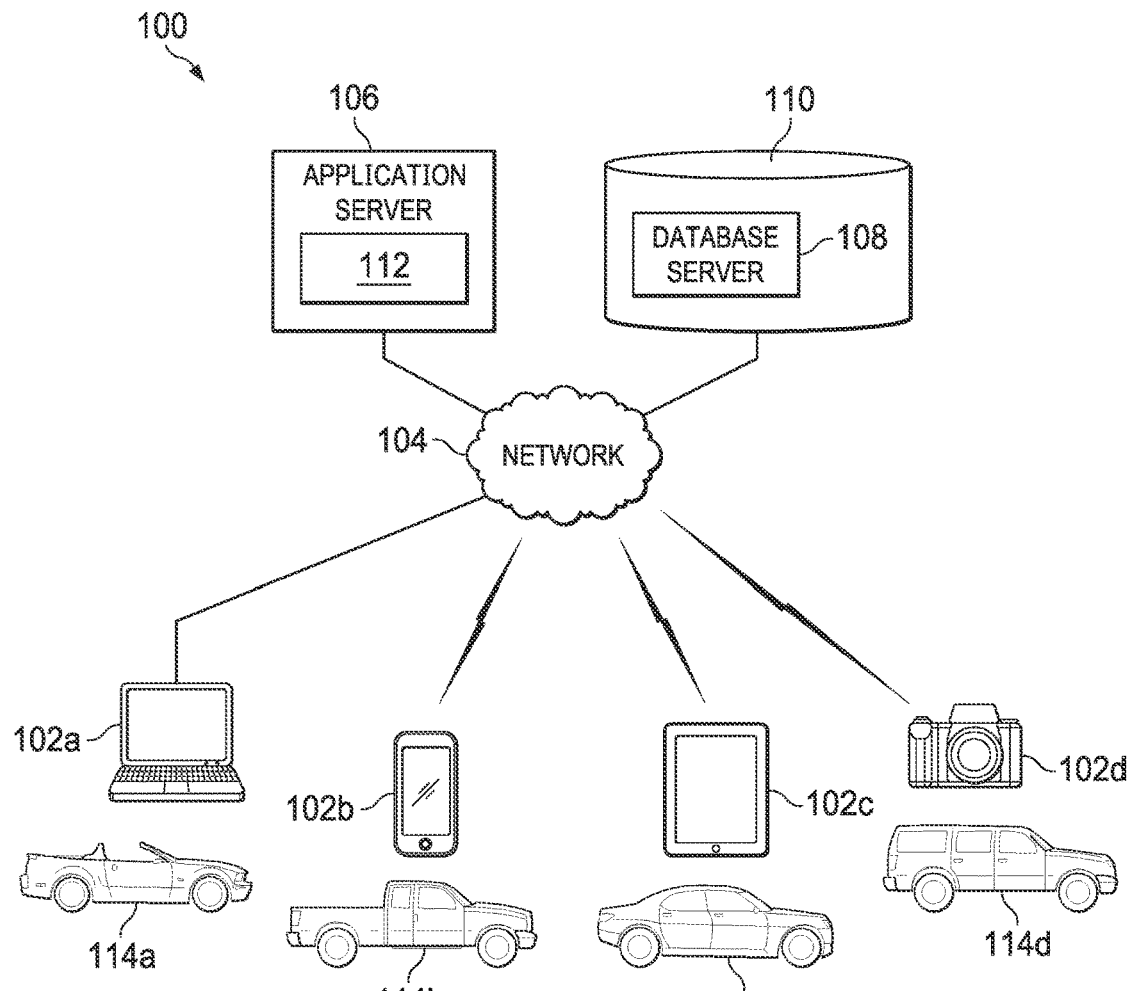
FIG. 1 illustrates an example system supporting the transfer of damage markers from images to three-dimensional (3D) vehicle models for damage assessment according to this disclosure.

FIGS. 1 through 11, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

As noted above, automotive vehicles, recreational vehicles, and other types of vehicles are routinely damaged in accidents or other incidents. For example, a vehicle can be damaged during a collision with another vehicle or with another stationary or moving object. As another example, a vehicle can be damaged during a weather event, such as during a hailstorm or when a tree limb falls on the vehicle. When a vehicle is damaged and needs repair, an appraiser, inspector, or other personnel typically need to inspect the damaged vehicle in order to estimate the cost of repairing the vehicle or to order parts for repairing the vehicle. As particular examples, an insurance adjuster may need to inspect the damaged vehicle in order to handle an insurance claim, or a vehicle repair inspector may need to inspect the damaged vehicle in order to provide an accurate repair estimate and parts list to the vehicle's owner or an insurance company.

Some approaches allow personnel like appraisers or inspectors or even vehicle owners themselves to provide images of damaged vehicles for automated analysis. For example, images of damaged vehicles may be captured and analyzed in order to identify damage to those vehicles and identify which parts of the vehicles are damaged and need repair or replacement. In some cases, a computing device may analyze an image and compare the size of the damage of a vehicle part (such as the number of pixels containing damage to the part in the image) to the overall size of the part (such as the number of pixels containing the entire part in the image). This allows for the estimation of the relative amount of damage to that part. However, this approach can be highly inaccurate in some cases since the results can vary based on a number of factors, including the image resolution, the distance from a vehicle at which an image is captured, or the orientation of the vehicle relative to a device capturing the image. Also, images routinely do not capture an entire part of a vehicle, such as when a vehicle's bumper is damaged, but an image only captures half or other portion of the bumper.

This disclosure provides techniques for transferring damage markers from images to three-dimensional (3D) vehicle models for damage assessment. As described in more detail below, an image of a vehicle can be obtained, such as from the vehicle's owner, an insurance adjuster, an appraiser, or other source. The image can be processed to segment the image and identify both (i) different components or parts of the vehicle and (ii) one or more damage markers associated with damage to one or more of the vehicle parts. The image can also be processed in order to estimate a pose of the vehicle within the image. The estimated pose of the vehicle within the image can be used to identify the orientation of a 3D vehicle model that is associated with the vehicle, and the damage marker(s) determined using the image can be mapped onto the 3D vehicle model. Prior to the mapping, morphing or warping of the one or more damage markers to account for the rendered dimensions of the 3D vehicle model having the estimated pose may be performed. Note that one, some, or all of the functions here can be performed using one or more trained machine learning models.

Once the one or more damage markers are mapped onto the 3D vehicle model, the 3D vehicle model with the damage marker(s) can be used in various ways, such as to estimate the damage to the vehicle (possibly both external and internal damage). For example, the 3D vehicle model with the damage marker(s) can be used to specifically identify the location(s) of damage to the vehicle and dimensions of the damage to the vehicle. If multiple images are available, the same process can be repeated for each image, and the resulting damage markers can be used to obtain a final 3D vehicle model mapped with all of the identified damage markers. This may be useful, for instance, when the vehicle has damage to multiple surfaces or sides of the vehicle. The estimated damage to the vehicle may then be used in any suitable manner, such as to identify one or more parts of the vehicle that may need repair or replacement, one or more types of repair operations that may need to be performed to repair the vehicle, and/or one or more costs associated with repairing the vehicle.

In this way, these techniques allow more accurate estimates to be obtained regarding the locations and the dimensions of damage to vehicles, and these results can be obtained more quickly and easily. As a result, these techniques can be used to obtain very accurate estimates of vehicle damage, repairs that are needed, and/or costs of needed repairs. Also, because one or more machine learning models can be trained and used to estimate repairs that may be needed, these techniques can be used to more accurately estimate all of the parts to vehicles that might be damaged and need repair or replacement. Moreover, by using one or more trained machine learning models, it is possible to remove individual biases or other inaccuracies that can result when different people individually make repair estimates for vehicles. This can help to provide more consistent repair estimates across vehicles. In addition, as described below, a number of features can be implemented within a computing device or system to help speed up or improve the analyses of images, such as through the use of small pose embeddings that can decrease memory requirements and/or speed up processing times for analyzing images of damaged vehicles.

FIG. 1 illustrates an example system 100 supporting the transfer of damage markers from images to 3D vehicle models for damage assessment according to this disclosure. As shown in FIG. 1, the system 100 includes user devices 102a-102d, one or more networks 104, one or more application servers 106, and one or more database servers 108 associated with one or more databases 110. Each user device 102a-102d communicates over the network(s) 104, such as via a wired or wireless connection. Each user device 102a-102d represents any suitable device or system used by at least one user to provide or receive information, such as a personal computer, a smartphone, a tablet computer, or a digital camera. However, any other or additional types of user devices may be used in or with the system 100.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations.

The application server 106 is coupled to the network 104 and is coupled to or otherwise communicates with the database server 108. The application server 106 supports the analysis of images captured or otherwise provided by the user devices 102a-102d or other suitable sources. For example, the application server 106 may execute one or more applications 112 that analyze images from the user devices 102a-102d along with 3D vehicle models from the database 110. The one or more applications 112 can use this information to estimate damage to various vehicles, such as vehicles 114a-114d. Note that the database server 108 may also be used within the application server 106 to store information, in which case the application server 106 may store the information itself used to perform image analysis and damage estimation. Also note that the functionality of the application server 106 may be physically distributed across multiple devices for redundancy, parallel processing, or other purposes.

The database server 108 operates to store and facilitate retrieval of various information used, generated, or collected by the application server 106 and the user devices 102a-102d in the database 110. For example, the database server 108 may store images captured by the user devices 102a-102d and 3D models of various vehicles. Note that the functionality of the database server 108 and the database 110 may be physically distributed across multiple devices for redundancy, parallel processing, or other purposes.

The vehicles 114a-114d here represent examples of the types of vehicles for which damage estimates can be generated by the application server 106. Here, the vehicles 114a-114d include a car (such as a sedan), a pickup truck, a sport utility vehicle, and a passenger van. However, these types of vehicles are for illustration only, and images of other types of vehicles (or portions thereof) can be obtained and analyzed by the application server 106. Other examples may include, for instance, motorcycles, cargo vans, cargo trucks, tractor-trailers, boats, and recreational vehicles.

The damage estimates produced by the application server 106 may be used in any suitable manner. For example, the damage estimates may be presented to one or more users via at least one graphical display, such as via a graphical user interface that displays a relevant 3D model of a vehicle and illustrates the identified damage on the 3D vehicle model. The damage estimates may also or alternatively be used by the application server 106 or other component to generate a listing of parts that are likely damaged and that may need to be replaced or repaired and/or a listing of repair steps to be taken to repair a vehicle. The damage estimates may also or alternatively be used by the application server 106 to generate itemized costs and/or a total cost for repairing a vehicle. Depending on the implementation, the generated parts list and/or cost(s) may be related to parts on the outer surface of a vehicle that need repair or replacement and/or internal parts within the vehicle that need repair or replacement. In general, one or more damage estimates may be used in any suitable manner.

Although FIG. 1 illustrates one example of a system 100 supporting the transfer of damage markers from images to 3D vehicle models for damage assessment, various changes may be made to FIG. 1. For example, the system 100 may include any number of user devices 102a-102d, networks 104, application servers 106, database servers 108, and databases 110. Also, these components may be located in any suitable location(s) and might be distributed over a large area. Further, while the application server 106 is described above as executing one or more applications 112 to perform one or more damage estimates, the application(s) 112 may be executed by desktop computers, laptop computers, smartphones, tablet computers, or other end user devices for individual users or by one or more cloud computing systems, remote servers, or other networked devices. In addition, while FIG. 1 illustrates one example operational environment in which one or more damage estimates may be generated and used, this functionality may be used in any other suitable system.

Figure 2:
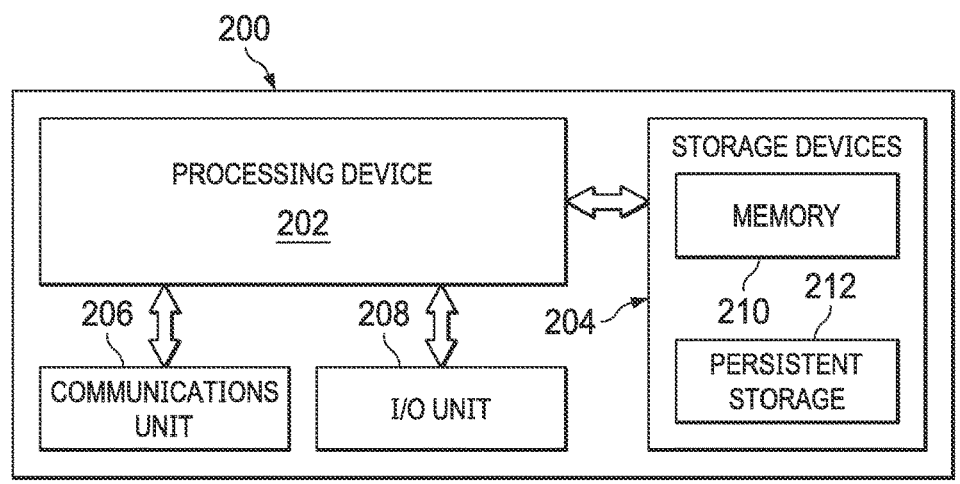
FIG. 2 illustrates an example device supporting the transfer of damage markers from images to 3D vehicle models for damage assessment according to this disclosure.

FIG. 2 illustrates an example device 200 supporting the transfer of damage markers from images to 3D vehicle models for damage assessment according to this disclosure. One or more instances of the device 200 may, for example, be used to at least partially implement the functionality of the application server 106 of FIG. 1, such as to execute the one or more applications 112 that analyze images and generate damage estimates for vehicles. However, the functionality of the application server 106 may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the one or more applications 112. Thus, for example, the instructions when executed may cause the processing device 202 to obtain at least one image of a damaged vehicle and identify and obtain a 3D vehicle model associated with the damaged vehicle. The instructions when executed may also cause the processing device 202, for each image, to identify one or more damage markers identifying damage to the vehicle and identify a pose of the vehicle within the image. The instructions when executed may further cause the processing device 202, for each image, to orient the 3D vehicle model in substantially the same pose as the vehicle in the image, optionally morph one or more damage markers associated with the image based on dimensions in the oriented 3D vehicle model, and map the one or more damage markers associated with the image onto the 3D vehicle model. If multiple images of the vehicle are being processed, the instructions when executed may cause the processing device 202 to generate a finalized 3D vehicle model containing the damage markers mapped from the multiple images. In addition, the instructions when executed may cause the processing device 202 to output or use the 3D vehicle model with the damage markers, such as by presenting a graphical user interface that contains the 3D vehicle model with the damage markers, estimating one or more parts of the vehicle to be repaired or replaced, estimating one or more repair operations to be performed on the vehicle (such as an identification of all replacement parts or other materials and all operations like filling/sanding or painting to be performed), and/or estimating itemized and/or total costs for repairing the vehicle.

Although FIG. 2 illustrates one example of a device 200 supporting the transfer of damage markers from images to 3D vehicle models for damage assessment, various changes may be made to FIG. 2. For example, computing and communication devices and systems come in a wide variety of configurations, and FIG. 2 does not limit this disclosure to any particular computing or communication device or system.

Figure 3:
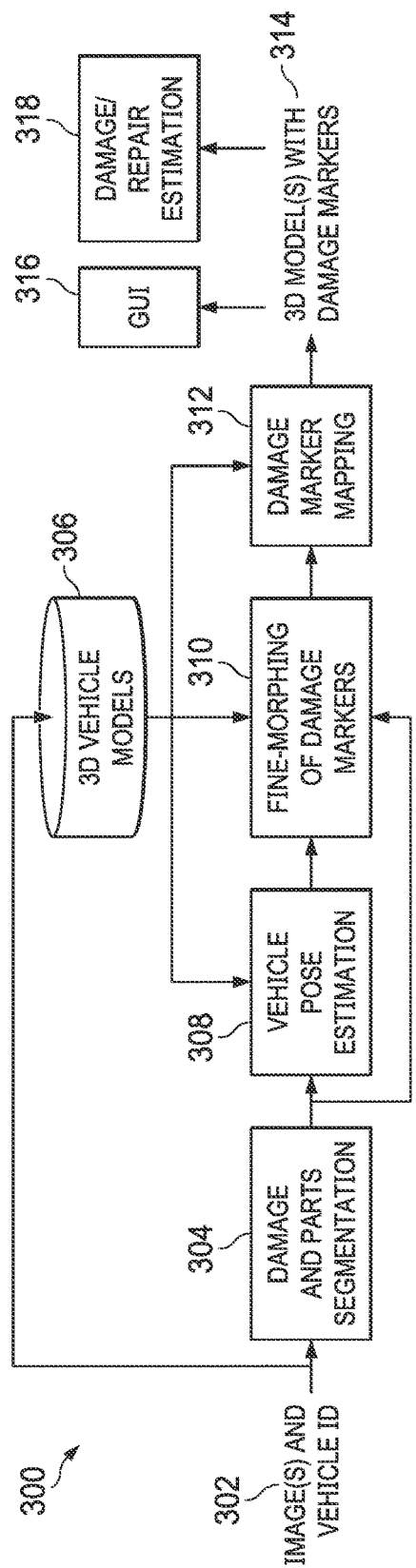
FIG. 3 illustrates an example functional architecture supporting the transfer of damage markers from images to 3D vehicle models for damage assessment according to this disclosure.

FIG. 3 illustrates an example functional architecture 300 supporting the transfer of damage markers from images to 3D vehicle models for damage assessment according to this disclosure. The functional architecture 300 may, for example, be implemented by the application server 106 in the system 100 of FIG. 1 using one or more instances of the device 200 of FIG. 2. However, the functional architecture 300 may be implemented using any other suitable device(s) and in any other suitable system(s).

As shown in FIG. 3, the functional architecture 300 receives one or more images of a damaged vehicle and an identification associated with the damaged vehicle as inputs 302. The one or more images of the damaged vehicle may be captured by and provided from any suitable source(s), such as one or more of the user devices 102a-102d. The identification associated with the damaged vehicle may represent, for example, an identification of the make/manufacturer, model, year, and other features (such as trim) of the damaged vehicle. The identification associated with the damaged vehicle may be obtained from a user or any other suitable source, or the identification associated with the damaged vehicle may be obtained automatically (such as by identifying the type of vehicle that is contained in an image using image processing or by using a vehicle identification number).

In this example, the one or more images of the damaged vehicle are provided to a damage and parts segmentation function 304, which generally operates to process each image of the damaged vehicle in order to identify specific components or parts of the damaged vehicle and damage to one or more of the identified parts of the damaged vehicle. For example, the damage and parts segmentation function 304 may perform object detection in order to identify the pixels or other portions of an image that are associated with a damaged vehicle being analyzed (as opposed to nearby or background objects, possibly including other vehicles). The damage and parts segmentation function 304 may also perform object segmentation in order to identify the pixels or other portions of the image that are associated with different components or parts of the damaged vehicle. For instance, depending on the angle of image capture, the damage and parts segmentation function 304 may identify different portions of the image that are associated with specific parts of the damaged vehicle, such as its hood, roof, trunk/tailgate/liftgate, front or rear bumper, front grill, driver or passenger front or rear door, driver or passenger front or rear panel, front or rear windshield, driver or passenger front or rear door glass, driver or passenger front or rear taillights, driver or passenger rearview mirror, front or rear license plate, or tires/wheels. In some cases, the damage and parts segmentation function 304 may identify the part of the damaged vehicle associated with each pixel of an image that contains the damaged vehicle. The damage and parts segmentation function 304 may further perform damage detection in order to identify one or more of multiple types of damage to one or more of the identified parts of the damaged vehicle. Example types of damage that may be identified by the damage and parts segmentation function 304 could include scratches, dents, cracks, glass damage, and missing parts.

In some embodiments, the damage and parts segmentation function 304 represents a machine learning model that has been trained to perform the described operations of the damage and parts segmentation function 304. For example, the damage and parts segmentation function 304 can be trained by providing a machine learning model with training images of a number of vehicles, where the training images may include vehicles at different orientations or poses within the training images. The training images may include damaged and undamaged vehicles, and the training images can be annotated. In some cases, the annotations of each training image may include (i) an identification of the outer boundary of the vehicle within the training image, (ii) an identification of the vehicle part associated with each pixel of the vehicle within the outer boundary of the vehicle in the training image, and (iii) an identification of any vehicle damage present within the training image and the type(s) of vehicle damage present within the training image. These training images can be used to modify parameters of the machine learning model so that the machine learning model is eventually able to effectively identify the boundaries of vehicles in images, segment the vehicles into their component parts in the images, and identify damage and the types of damage to the various parts of the vehicles in the images. For instance, the machine learning model can be trained iteratively using the training images until the behavior of the machine learning model converges or until a specified amount of time or a specified number of training iterations has elapsed.

Note that while a single machine learning model is described here as being used for the damage and parts segmentation function 304, it is possible to implement the functionality of the damage and parts segmentation function 304 using multiple machine learning models. For example, one machine learning model may be trained to identify the outer boundaries of damaged vehicles in images, another machine learning model may be trained to segment the images of damaged vehicles in order to identify the various parts of the damaged vehicles, and yet another machine learning model may be trained to identify damage and specific types of damage to various parts of the damaged vehicles. Also note that the damage and parts segmentation function 304 may be implemented using any suitable type(s) of machine learning model(s), such as one or more deep learning architectures like one or more deep neural networks (DNNs) or convolution neural networks (CNNs). In other embodiments, the damage and parts segmentation function 304 may be implemented using an algorithm or in any other suitable manner.

The identification associated with a damaged vehicle from the input 302 is used to obtain a 3D vehicle model associated with the damaged vehicle. For example, the 3D vehicle model may be obtained from a database 306 containing multiple 3D vehicle models. Each 3D vehicle model generally represents a three-dimensional model of at least the outer appearance of a specific type of vehicle (without damage). Each 3D vehicle model is typically associated with a vehicle of a specific make, a specific model, a specific year, and optionally a specific trim. Thus, vehicles of different makes, models, years, and/or trims can be associated with different 3D models in the database 306. Each 3D vehicle model may or may not include information regarding the internal components or structure of a specific vehicle. The database 306 may include any suitable number of 3D vehicle models. To support the use of the functional architecture 300 as broadly as possible, the database 306 may include as many 3D vehicle models for as many types of vehicles as possible.

Outputs from the damage and parts segmentation function 304 may include, for each input image being processed, a mask or other information identifying the different parts of a damaged vehicle in the image and a mask or other information identifying one or more damaged portions of the vehicle and the type(s) of damage in the image. Information identifying a damaged portion of a vehicle in an image and optionally the type of damage to the vehicle may be referred to as a damage marker. This information can be processed, along with the appropriate 3D vehicle model from the database 306, using a vehicle pose estimation function 308. The vehicle pose estimation function 308 generally operates to identify how a damaged vehicle is oriented within an image based on the 3D vehicle model for that damaged vehicle. For example, the vehicle pose estimation function 308 may determine how a 3D vehicle model for a specific type of vehicle needs to be rotated about three orthogonal axes (or otherwise rotated) in order to have the same orientation as shown in a captured image of a damaged vehicle of the same type. In some cases as described below, the pose estimation can be performed using a subset of vehicle features (parts) and/or one or more cutouts or other portions of input images. Also, in some cases as described below, the pose estimation can be performed by comparing different pose embeddings within a feature space. Either or both of these approaches may be useful in reducing processing times and/or storage requirements associated with the functional architecture 300.

In some embodiments, the vehicle pose estimation function 308 may be implemented using a machine learning model that has been trained to perform the described operations of the vehicle pose estimation function 308. For example, the vehicle pose estimation function 308 can be trained by providing a machine learning model with training data, where the training data may include segmented images of vehicles at various known orientations and where the segmented images are associated with known 3D vehicle models. During the training, the vehicle pose estimation function 308 can be trained to identify how to rotate the associated 3D vehicle models in order to identify the poses of the vehicles in the segmented images. In some cases, annotations in the training data may include angles or other amounts of rotation of the associated 3D models about relevant axes or other information defining the expected rotations of the associated 3D models. This training data can be used to modify parameters of the machine learning model so that the machine learning model is eventually able to effectively identify the poses of vehicles in images. For instance, the machine learning model can be trained iteratively using the training data until the behavior of the machine learning model converges or until a specified amount of time or a specified number of training iterations has elapsed. In other embodiments, the vehicle pose estimation function 308 may be implemented using an algorithm or in any other suitable manner.

Outputs from the vehicle pose estimation function 308 may include, for each input image being processed, a pose of the damaged vehicle in the image, which may be expressed as the rotations of the associated 3D model about various axes needed to match (at least within some threshold amount) the orientation of the damaged vehicle in the image. The outputs from the damage and parts segmentation function 304 and the vehicle pose estimation function 308, along with the appropriate 3D vehicle model, are provided to a fine-morphing function 310. The fine-morphing function 310 morphs or warps one or more damage markers obtained using the associated input image to match or fit the rendered dimensions of the 3D vehicle model when positioned in the identified pose. Effectively, the fine-morphing function 310 warps one or more damage markers obtained using an input image to align more closely with the actual part boundaries of the 3D vehicle model. Depending on the implementation, the fine-morphing function 310 may be implemented using a machine learning model or an algorithm (such as an image processing algorithm) or implemented in any other suitable manner.

Outputs from the fine-morphing function 310 may include, for each input image being processed, one or more transformed (morphed or warped) damage markers. The one or more transformed damage markers, along with the appropriate 3D vehicle model, are provided to a damage marker mapping function 312. The damage marker mapping function 312 generally operates to map the one or more transformed damage markers generated for each input image onto the 3D vehicle model for the damaged vehicle. In some cases, for instance, the damage marker mapping function 312 may determine where virtual camera rays (which are associated with pixels containing vehicle damage in an input image) strike one or more outer surfaces of the 3D vehicle model when the 3D vehicle model has the same orientation or pose as the damaged vehicle in the input image. The intersections of the virtual camera rays with the outer surface(s) of the 3D vehicle model can be used to generate mapped damage markers on the 3D vehicle model for the damaged vehicle. This helps to convert one or more two-dimensional damage markers generated using an input image into one or more three-dimensional damage markers on the 3D vehicle model. The damage marker mapping function 312 also generates one or more outputs 314, which can include at least one 3D vehicle model having one or more damage markers mapped onto the 3D vehicle model.

Note that if multiple input images of the same damaged vehicle are being processed, the damage marker mapping function 312 may combine the results from the processing described above to generate the output(s) 314 for the damaged vehicle. For example, in some cases, the damage marker mapping function 312 can generate separate 3D vehicle models having one or more damage markers associated with different input images, and the damage marker mapping function 312 can aggregate or combine the 3D vehicle models to generate a final 3D vehicle model as an output 314. In other cases, the damage marker mapping function 312 may sequentially map damage markers associated with different input images onto the same 3D vehicle model, such as by rotating the 3D vehicle model as defined for one input image's pose, mapping the damage marker(s) associated with this input image onto the 3D vehicle model, rotating the 3D vehicle model again as defined for another input image's pose, mapping the damage marker(s) associated with that input image onto the 3D vehicle model, and so on. In general, the damage marker mapping function 312 can use any suitable technique to combine damage markers obtained using multiple input images onto a common 3D vehicle model.

In some embodiments, the damage marker mapping function 312 may be implemented using a machine learning model that has been trained to perform the described operations of the damage marker mapping function 312. For example, the damage marker mapping function 312 can be trained by providing a machine learning model with training data, where the training data may include masks or other information identifying the damage markers associated with input images and 3D vehicle models. During the training, the damage marker mapping function 312 can be trained to identify how to map the damage markers associated with the input images onto the 3D vehicle models. In some cases, annotations in the training data may include identifications of how the damage markers associated with the input images should be properly mapped onto the 3D vehicle models. The training data can be used to modify parameters of the machine learning model so that the machine learning model is eventually able to effectively map damage markers onto 3D vehicle models. For instance, the machine learning model can be trained iteratively using the training data until the behavior of the machine learning model converges or until a specified amount of time or a specified number of training iterations has elapsed. In other embodiments, the damage marker mapping function 312 may be implemented using an algorithm or in any other suitable manner.

The outputs 314 (representing at least one 3D vehicle model with one or more mapped damage markers thereon) may be used in any suitable manner. For example, the outputs 314 may be provided to a graphical user interface (GUI) function 316, which can generate at least one graphical user interface for presentation to one or more users. The graphical user interface may present the 3D vehicle model associated with a damaged vehicle to a user, along with the one or more damage markers mapped onto the 3D vehicle model. In some embodiments, the 3D vehicle model may be rotatable within the graphical user interface so that the user is able to view the 3D vehicle model and see the one or more damage markers from different directions.

As another example, the outputs 314 may be provided to a damage/repair estimation function 318, which can identify the part or parts of a damaged vehicle that may need to be repaired or replaced. Depending on the implementation, the damage/repair estimation function 318 can identify parts on the outer surface of a vehicle that may need repair or replacement and/or internal parts within the vehicle that may need repair or replacement. The damage/repair estimation function 318 may also or alternatively identify repair operations to be performed to the damaged vehicle, such as by identifying parts and other materials and operations that may be needed to repair the damaged vehicle. The damage/repair estimation function 318 may also or alternatively identify one or more costs associated with repairing the damaged vehicle. In some embodiments, the damage/repair estimation function 318 may perform operations such as those disclosed in U.S. Patent Application No. 2020/0111061A1, except the approaches described in that application can be modified to use 3D vehicle models with damage markers mapped thereon (rather than using images). U.S. Patent Application No. 2020/0111061A1 is hereby incorporated by reference in its entirety. Note that because the functional architecture 300 here can accurately identify both the locations and dimensions of damage to vehicles on 3D models of the vehicles, results like damage or repair estimates can be much more accurate.

Although FIG. 3 illustrates one example of a functional architecture 300 supporting the transfer of damage markers from images to 3D vehicle models for damage assessment, various changes may be made to FIG. 3. For example, various functions and components shown in FIG. 3 may be combined, further subdivided, replicated, omitted, or rearranged and additional functions and components may be added according to particular needs. Also, the outputs 314 may be used in any other suitable manner.

Figure 4:
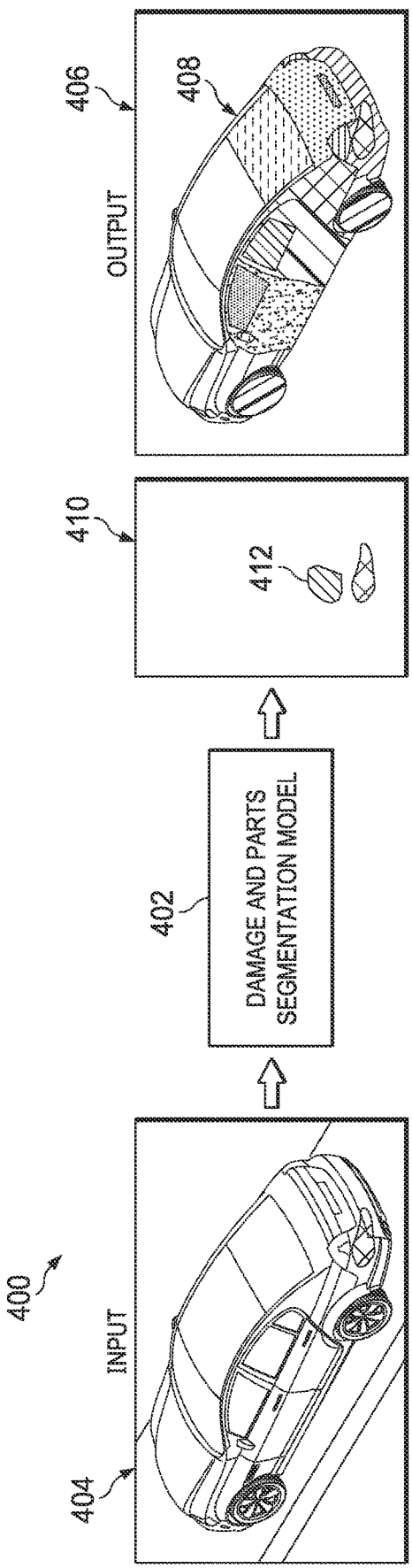
FIG. 4 illustrates an example damage and parts segmentation process in the functional architecture of FIG. 3 according to this disclosure.

FIG. 4 illustrates an example damage and parts segmentation process 400 in the functional architecture 300 of FIG. 3 according to this disclosure. The damage and parts segmentation process 400 shown in FIG. 4 may, for example, represent a process that is performed by the damage and parts segmentation function 304 in the functional architecture 300 of FIG. 3. However, the damage and parts segmentation function 304 in the functional architecture 300 of FIG. 3 may be implemented in any other suitable manner, and the damage and parts segmentation process 400 of FIG. 4 may be used in any other suitable functional architecture.

As shown in FIG. 4, the damage and parts segmentation process 400 here involves the use of a damage and parts segmentation machine learning model 402. The machine learning model 402 can be trained as described above to identify the outer boundary of a damaged vehicle within an image, segment the image to identify specific parts of the damaged vehicle within the image, and identify any vehicle damage presented within the image and the type(s) of vehicle damage present within the image. As noted above, while a single machine learning model 402 may be used to perform all three of these functions, separate machine learning models may be used to perform these functions in other embodiments.

An example of the types of operations that can be performed by the damage and parts segmentation machine learning model 402 are shown in FIG. 4. Here, an input image 404 is obtained, where the input image 404 represents an image captured of a damaged vehicle. In this particular example, the input image 404 captures the damaged vehicle and additional vehicles and other objects in the background. This particular damaged vehicle has a broken driver side rear taillight and scratches on its rear bumper. The damage and parts segmentation machine learning model 402 can process the input image 404 in order to identify an outer boundary of the damaged vehicle within the input image 404. This can help to exclude pixels of the input image 404 that capture the ground, the sky, or other objects in the background or the foreground from further processing.

The damage and parts segmentation machine learning model 402 can also process the input image 404 in order to segment the input image 404 and identify different parts of the damaged vehicle within the input image 404. The results of this processing may be expressed in a first output mask 406, where the output mask 406 identifies different segmented portions 408 of the input image 404 that are associated with different components or parts of the damaged vehicle. In this example, the input image 404 is a rear perspective view of the damaged vehicle from the driver's side. The output mask 406 may therefore identify segmented portions 408 of the input image 404 that represent contours of different parts of the damaged vehicle like its trunk/tailgate/liftgate, rear bumper, driver side door(s), driver side panel(s), rear windshield, driver side door glass, rear taillight(s), driver side rearview mirror, rear license plate, or one or more tires/wheels. The actual parts of the damaged vehicle that can be identified in the output mask 406 depend on the orientation of the damaged vehicle within the input image 404.

Segmented portions 408 of the damaged vehicle can be identified in the output mask 406 in any suitable manner, such as by using different values in the output mask 406 to identify different parts of a vehicle. In some cases, each pixel of the input image 404 that is within the identified outer boundary of the damaged vehicle can have a corresponding value in the output mask 406, and that pixel's value in the output mask 406 can identify which part of the damaged vehicle is associated with that pixel. Thus, for example, a pixel of the input image 404 identified as being within the rear bumper of the damaged vehicle may be assigned a value that is associated with a vehicle bumper, while a pixel of the input image 404 identified as being within a rear taillight of the damaged vehicle may be assigned a different value that is associated with a vehicle rear taillight. Any suitable values may be used here to distinguish between different types of vehicle parts in the output mask 406.

The damage and parts segmentation machine learning model 402 can further process the input image 404 in order to identify one or more damaged areas of the vehicle and to identify the type(s) of damage to the vehicle. The results of this processing may be expressed in a second output mask 410, where the output mask 410 includes one or more damage markers 412 associated with identified damage to the vehicle. Each damage marker 412 here can identify the location and the contour of damage to the vehicle as contained within the input image 404. Each damage marker 412 here can also identify the type of damage to the vehicle as contained within the input image 404, such as by identifying whether detected damage represents a scratch, a dent, a crack, glass damage, or a missing part.

Damage markers 412 can be identified in the output mask 410 in any suitable manner, such as by using different values in the output mask 410 to identify different types of damage at one or more locations of the vehicle. In some cases, each pixel of the input image 404 within the identified outer boundary of the damaged vehicle can have a corresponding value in the output mask 410 if damage is detected at that pixel, and the corresponding value for that pixel can identify the type of damage associated with that pixel. Note that, depending on the implementation, a single type of damage may be associated with a pixel, or multiple types of damage may be associated with a pixel (such as when a scratch and a dent are detected at that location). Multiple types of damage associated with the same pixel may be identified in any suitable manner, such as by associating multiple values each representative of a single type of damage with that pixel or by associating a single value representative of multiple types of damage with that pixel. Thus, for example, a pixel of the input image 404 identified as being within the rear bumper of the damaged vehicle may be assigned a value that is associated with a scratch or dent, while a pixel of the input image 404 identified as being within a rear taillight of the damaged vehicle may be assigned a different value that is associated with glass damage. Any suitable values may be used here to distinguish between different types of vehicle damage in the output mask 410.

In this way, the damage and parts segmentation machine learning model 402 can be used to identify both (i) the contours of individual parts of a damaged vehicle within an input image 404 and (ii) the contours of one or more instances of one or more types of damage to the damaged vehicle within the input image 404. These contours can be further processed (as described above and below) to map the one or more damage markers 412 to a 3D vehicle model that is associated with the damaged vehicle in the input image 404.

Although FIG. 4 illustrates one example of a damage and parts segmentation process 400 in the functional architecture 300 of FIG. 3, various changes may be made to FIG. 4. For example, the inputs and outputs shown here are for illustration only. The input images 404 that are processed using the damage and parts segmentation machine learning model 402 can vary widely, and the damage to the vehicles captured in the input images 404 can vary widely. Thus, the outputs generated by the damage and parts segmentation machine learning model 402 can vary widely depending on the input images 404 being processed. Also, the use of a machine learning model is not necessarily required to implement the damage and parts segmentation process 400.

Figure 5:
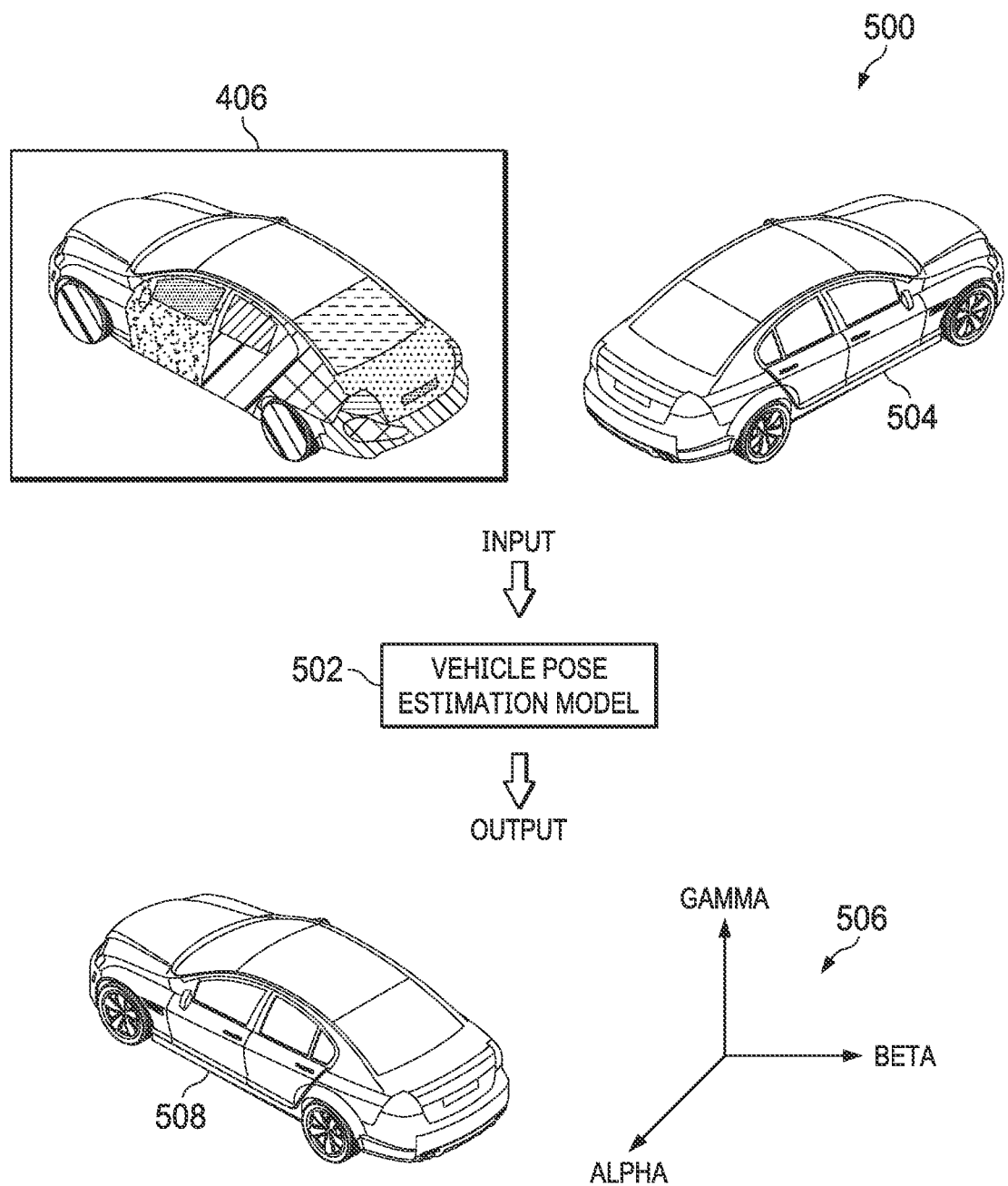
FIGS. 5 through 7 illustrate example vehicle pose estimation processes in the functional architecture of FIG. 3 according to this disclosure.
Figure 6:
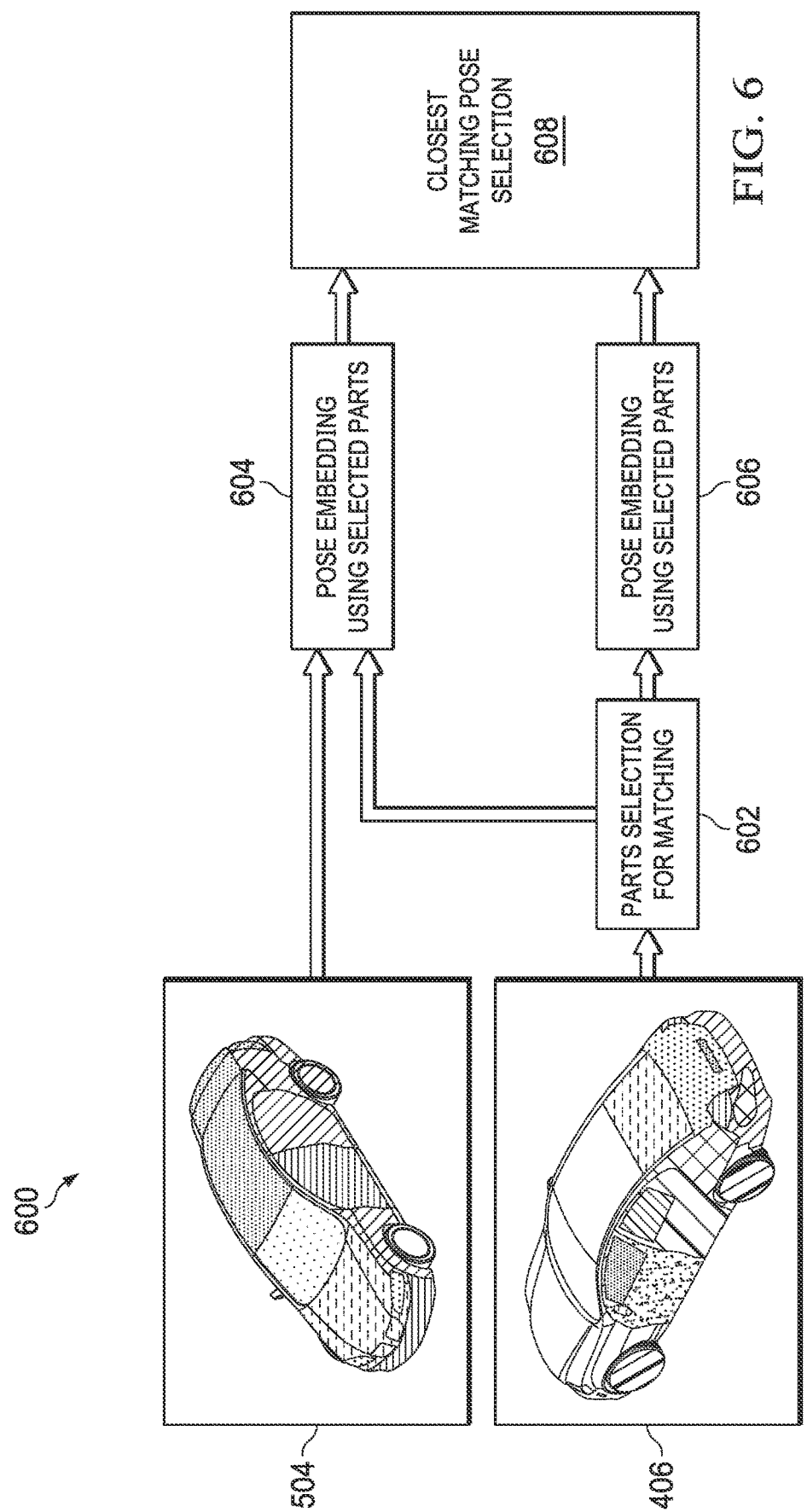
Figure 7:
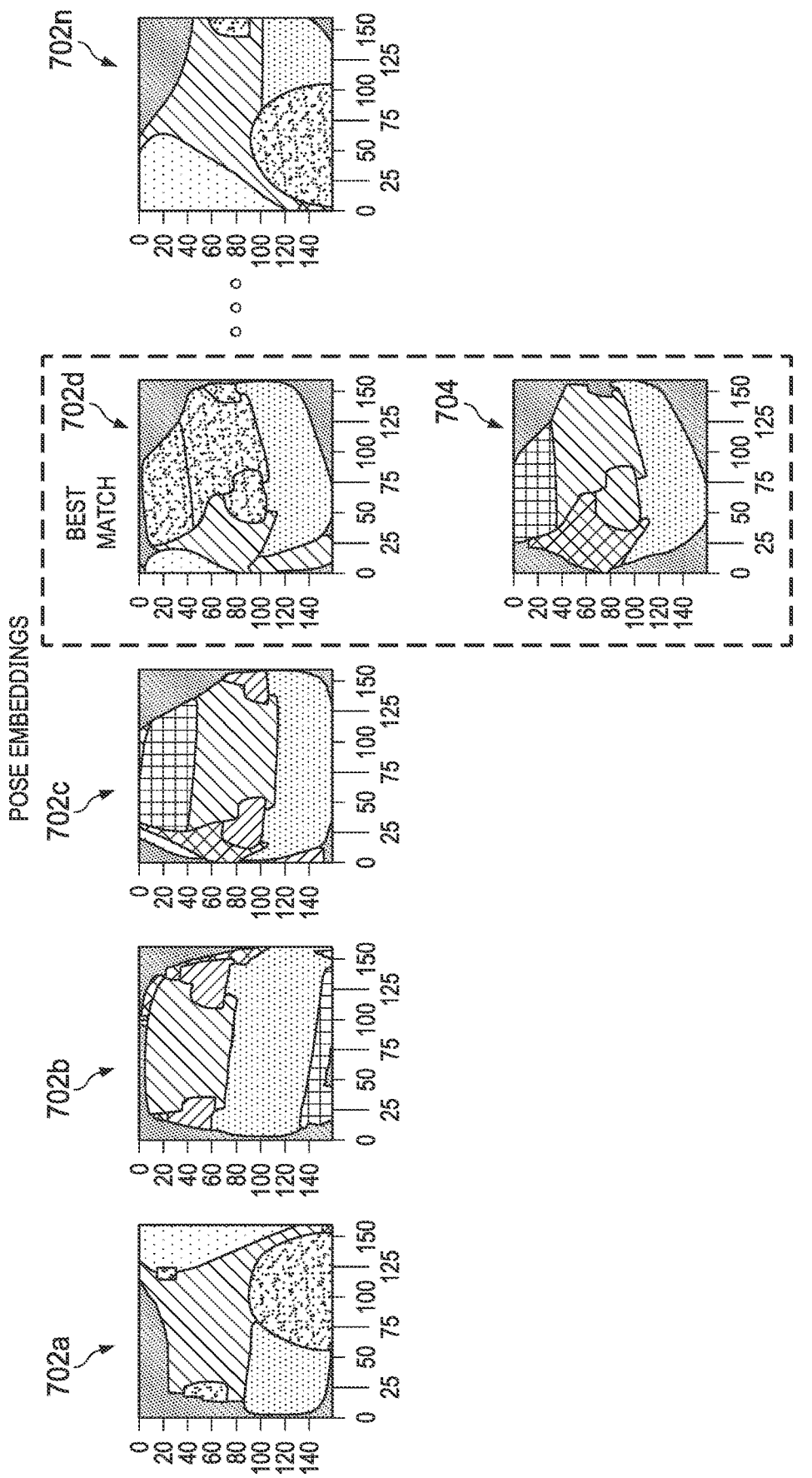

FIGS. 5 through 7 illustrate example vehicle pose estimation processes 500, 600 in the functional architecture 300 of FIG. 3 according to this disclosure. Each of the vehicle pose estimation processes 500, 600 shown in FIGS. 5 through 7 may, for example, represent a process that is performed by the vehicle pose estimation function 308 in the functional architecture 300 of FIG. 3. However, the vehicle pose estimation function 308 in the functional architecture 300 of FIG. 3 may be implemented in any other suitable manner, and the vehicle pose estimation processes 500, 600 of FIGS. 5 through 7 may be used in any other suitable functional architecture.

As shown in FIG. 5, the vehicle pose estimation process 500 here involves the use of a vehicle pose estimation machine learning model 502. The machine learning model 502 can be trained as described above to identify the pose of a damaged vehicle within an image, such as within the input image 404. The pose of the damaged vehicle within the image can be used to define how a 3D vehicle model associated with the damaged vehicle should be rotated or otherwise oriented in order to match (at least within some threshold amount) the orientation of the damaged vehicle within the image.

An example of the types of operations that can be performed by the vehicle pose estimation machine learning model 502 are shown in FIG. 5. Here, an output mask 406 associated with a damaged vehicle and a 3D vehicle model 504 associated with the damaged vehicle are obtained. In some embodiments, the output mask 406 may be obtained using the damage and parts segmentation process 400, and the 3D vehicle model 504 can be obtained from the database 306 based on the vehicle identification contained in the inputs 302. As can be seen here, the 3D vehicle model 504 associated with the damaged vehicle may initially have an orientation that is significantly different compared to the output mask 406 associated with the damaged vehicle. The vehicle pose estimation machine learning model 502 can process the output mask 406 and the 3D vehicle model 504 in order to identify how the 3D vehicle model 504 should be rotated or otherwise oriented based on the orientation of the damaged vehicle within the input image 404 as defined by the output mask 406.

The vehicle pose estimation machine learning model 502 in this example can determine how the 3D vehicle model 504 should be rotated around a set 506 of axes in order to obtain a specified orientation 508. Ideally, the specified orientation 508 causes the 3D vehicle model 504 to obtain the same orientation as the damaged vehicle is oriented within the input image 404. In this particular example, the axes in the set 506 represent three axes that are orthogonal to one another, although other suitable axes or coordinate systems (such as a polar system) may be used here. Also, while the axes in the set 506 here are denoted alpha, beta, and gamma, other suitable names may be used for the axes.

In some embodiments, the vehicle pose estimation machine learning model 502 may use the entire output mask 406 when determining how to rotate the 3D vehicle model 504. In other embodiments, the vehicle pose estimation machine learning model 502 may use a subset of the vehicle parts from the output mask 406 and/or one or more cutouts or portions of the output mask 406 when determining how to rotate the 3D vehicle model 504. For example, the vehicle pose estimation machine learning model 502 may use only the identified wheels in the output mask 406 or only a central portion of the output mask 406 when attempting to identify how the 3D vehicle model 504 should be rotated. Note, however, that the vehicle pose estimation machine learning model 502 may use any other suitable subset of vehicle parts and/or any other suitable portion(s) of the output mask 406 when determining how the 3D vehicle model 504 should be rotated.

The outputs of the vehicle pose estimation machine learning model 502 may be expressed in various ways. For instance, in some cases, the vehicle pose estimation machine learning model 502 may output angles or other values identifying how to rotate the 3D vehicle model 504 about the axes in order to obtain the specified orientation 508 of the 3D vehicle model 504. In other cases, the vehicle pose estimation machine learning model 502 may output the 3D vehicle model 504 itself at the specified orientation 508.

In this way, the vehicle pose estimation machine learning model 502 can be used to identify how a 3D vehicle model 504 associated with a damaged vehicle can be oriented in order to at least substantially match the orientation of the damaged vehicle in an input image. This allows for further processing (as described above and below) to map one or more damage markers, such as the damage markers 412, onto the 3D vehicle model 504 associated with the damaged vehicle. Note that the output mask 406 is used here rather than the input image 404 since the use of the output mask 406 typically avoids problems associated with using actual photographic images, such as differences in color, illumination, or other photographic effects. However, in other embodiments, the input image 404 may be used by the vehicle pose estimation machine learning model 502 instead of or in addition to the output mask 406.

As shown in FIG. 6, the vehicle pose estimation process 600 here involves the use of an output mask 406, a 3D vehicle model 504, and various functions 602-608 that are used to identify a pose of a damaged vehicle within an image, such as the input image 404. In this example, the 3D vehicle model 504 associated with a damaged vehicle again may initially have a significantly different orientation compared to the orientation of the damaged vehicle as defined by the output mask 406. Here, a parts selection function 602 can be used to select one or more parts of the damaged vehicle for use in the identification of the damaged vehicle's pose. The parts selection function 602 can be used to select one or more parts of the damaged vehicle that are clearly visible within the output mask 406 and that can be used for pose estimation purposes. As a particular example, when both headlights or both taillights of the damaged vehicle are visible in the output mask 406, the parts selection function 602 may select the headlights or taillights for use in pose estimation (since these parts of the damaged vehicle can easily be used to identify the specific pose of the damaged vehicle). Note, however, that any other suitable part or parts of the damaged vehicle may be selected depending on the particular output mask 406 being processed.

The selected part or parts of the damaged vehicle are used by a pose embedding function 604 to retrieve, generate, or otherwise obtain different embedded poses of the 3D vehicle model 504 and by a pose embedding function 606 to generate an embedded pose of the output mask 406. The pose embeddings here refer to renderings of the 3D vehicle model 504 and the output mask 406 within a feature space. Each pose embedding produced by the function 604 represents an embedded rendering of a portion of the 3D vehicle model 504 containing the identified part(s). Similarly, the pose embedding produced by the function 606 represents an embedded rendering of a portion of the output mask 406 containing the identified part(s). As a result, the functions 604 and 606 can be used here to generate small embeddings of portions of the 3D vehicle model 504 and the output mask 406 within the feature space.

The embeddings of the 3D vehicle model 504 can be generated using different orientations of the 3D vehicle model 504, and the embedding for the output mask 406 can be compared to the embeddings of the 3D vehicle model 504 by a closest matching pose selection function 608. The closest matching pose selection function 608 can select the embedding of the 3D vehicle model 504 that is closest in similarity to the embedding of the output mask 406, which provides an estimate of the damaged vehicle's pose in the input image 404. Effectively, this approach uses the embeddings to represent different vehicle poses, and the distance or other similarity measure between two embeddings (one representing the 3D vehicle model 504 and one representing the output mask 406) represents the difference between the embeddings. Selecting the embedding of the 3D vehicle model 504 that is closest or otherwise most similar to the embedding of the output mask 406 allows for the selection of the pose of the 3D vehicle model 504 that is closest to the damaged vehicle's actual pose in the input image 404. Any suitable measure of similarity between embeddings can be used here, such as per-pixel Euclidean distance or intersection over union (IoU) measurements.

One example of these operations is shown in FIG. 7, where pose embeddings 702a-702n represent possible embeddings of the 3D vehicle model 504 at different orientations and a pose embedding 704 represents an embedding of the output mask 406. Each of the pose embeddings 702a-702n includes or is based on at least a portion of one or more parts identified by the parts selection function 602. In some cases, the pose embeddings 702a-702n here may be pre-determined and stored in a cache or other location in order to help speed up processing of input images 404. However, this is not necessarily required, and the pose embeddings 702a-702n may be generated on demand or in any other suitable manner. In this example, the pose embedding 702d is determined by the function 608 to be most similar to the pose embedding 704, so the pose of the 3D vehicle model 504 associated with the pose embedding 702d may be selected as the pose of the damaged vehicle. If necessary or desirable, the pose of the 3D vehicle model 504 associated with the pose embedding 702d may be further adjusted in order to be more closely matched to the actual pose of the damaged vehicle in the input image 404.

Note that the number of pose embeddings 702a-702n and the sizes/resolutions of the pose embeddings 702a-702n may vary depending on the implementation. For instance, the resolutions of the pose embeddings 702a-702n may be decreased to permit more pose embeddings 702a-702n to be cached, stored, or used or to reduce the memory requirements for storing the pose embeddings 702a-702n. Again, the selected orientation may be output and expressed in various ways, such as by outputting angles or other values identifying how to rotate the 3D vehicle model 504 about relevant axes or outputting the 3D vehicle model 504 itself at the desired orientation.

In this way, the process 600 can be used to identify how a 3D vehicle model 504 for a damaged vehicle can be oriented in order to at least substantially match the orientation of the damaged vehicle in an input image. This allows for further processing (as described above and below) to map one or more damage markers, such as the damage markers 412, onto the 3D vehicle model 504 associated with the damaged vehicle.

Although FIGS. 5 through 7 illustrate examples of vehicle pose estimation processes 500, 600 in the functional architecture 300 of FIG. 3, various changes may be made to FIGS. 5 through 7. For example, the inputs and outputs shown here are for illustration only. The output masks 406 and the 3D vehicle models 504 that are processed using the vehicle pose estimation processes 500, 600 can vary widely. Thus, the outputs generated by the vehicle pose estimation processes 500, 600 can vary widely depending on the output masks 406 and the 3D vehicle models 504 being processed. Also, the use of a machine learning model is not necessarily required to implement the vehicle pose estimation process 500.

Figure 8:
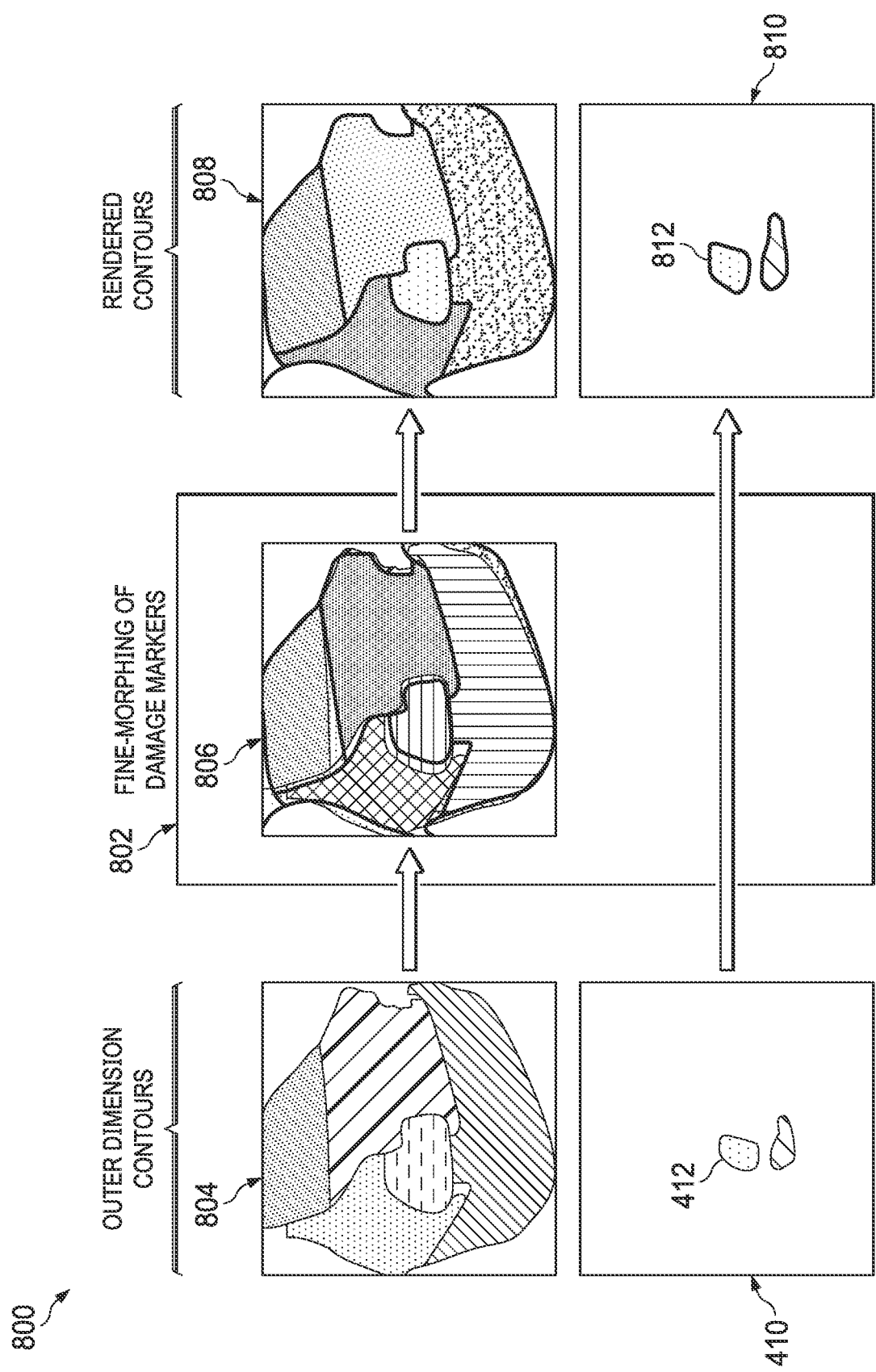
FIG. 8 illustrates an example damage marker morphing process in the functional architecture of FIG. 3 according to this disclosure.

FIG. 8 illustrates an example damage marker morphing process 800 in the functional architecture 300 of FIG. 3 according to this disclosure. The damage marker morphing process 800 shown in FIG. 8 may, for example, represent a process that is performed by the fine-morphing function 310 in the functional architecture 300 of FIG. 3. However, the fine-morphing function 310 in the functional architecture 300 of FIG. 3 may be implemented in any other suitable manner, and the damage marker morphing process 800 of FIG. 8 may be used in any other suitable functional architecture.

As shown in FIG. 8, the damage marker morphing process 800 here involves the use of an image transformation function 802, which can be used to morph or warp image data. An example of the types of operations that can be performed by the image transformation function 802 are shown in FIG. 8. Here, image data 804 defines the outer contours of different parts of a damaged vehicle as contained within an image, such as an input image 404. In some embodiments, for example, the image data 804 may represent or include at least the portion of the output mask 406 that is associated with one or more damage markers 412.

In general, contours of a rendered (oriented) version of a 3D vehicle model (such as a 3D vehicle model 504) may not exactly match the contours of an output mask 406 generated using the input image 404. Among other reasons, characteristics of the imaging device that captures the input image 404 may not be known, or other uncontrolled image processing operations or other operations may be performed by the imaging device. While the pose estimate generated by the vehicle pose estimation function 308 can provide a generally accurate match between the orientation of a damaged vehicle in an input image 404 and the orientation of a 3D vehicle model 504 associated with the damaged vehicle, there may still be some differences between contours of the vehicle parts as identified in the output mask 406 for the damaged vehicle and contours of the same vehicle parts as identified in the 3D vehicle model having the identified pose or orientation.

The image transformation function 802 helps to compensate for these types of differences by determining how the outer contours of the different parts of the damaged vehicle as defined by the image data 804 differ from the outer contours of the same parts as defined by the 3D vehicle model in the identified orientation. The image transformation function 802 uses these differences to identify a warping function 806 that, if applied to the image data 804, produces transformed image data 808 that defines the outer contours of the different parts of the damaged vehicle much more closely to the outer contours of the same parts in the 3D vehicle model. Ideally, the outer contours of the vehicle parts as defined by the transformed image data 808 match the outer contours of the same vehicle parts as defined by the 3D vehicle model, although some small amounts of mismatch may still exist.

The image transformation function 802 can then apply the same warping function 806 to the output mask 410 that includes the one or more damage markers 412. The image transformation function 802 thereby warps the output mask 410 and the one or more damage markers 412, which results in the generation of a transformed output mask 810 that includes one or more transformed damage markers 812. The one or more transformed damage markers 812 represent one or more areas of damage to the damaged vehicle as identified by the original damage markers 412, but the one or more transformed damage markers 812 have been resized or otherwise warped based on the same modifications used match or substantially match the vehicle part contours from the output mask 406 to the vehicle part contours from the 3D vehicle model.

In this way, the process 800 can be used to transform one or more damage markers 412 generated using an input image 404 into one or more damage markers 812 suitable for use with a 3D vehicle model. This allows for further processing (as described above and below) to map the one or more transformed damage markers 814 onto the 3D vehicle model associated with the damaged vehicle.

Although FIG. 8 illustrates one example of a damage marker morphing process 800 in the functional architecture 300 of FIG. 3, various changes may be made to FIG. 8. For example, the inputs and outputs shown here are for illustration only. The vehicle part contours and damage markers that are processed using the damage marker morphing process 800 can vary widely. Thus, the outputs generated by the damage marker morphing process 800 can vary widely depending on the vehicle part contours and damage markers being processed.

Figure 9:
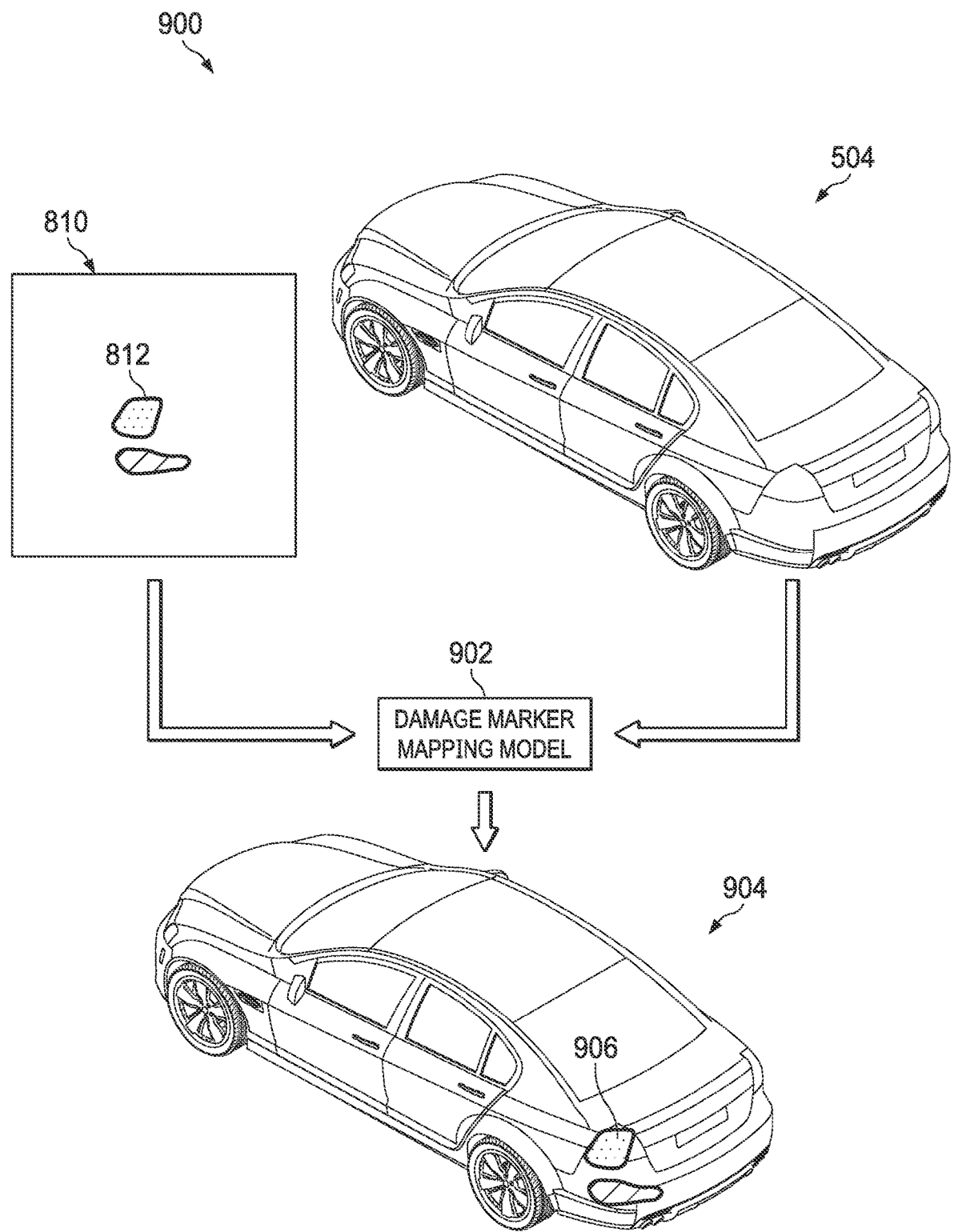
FIGS. 9 and 10 illustrate example damage marker mapping processes in the functional architecture of FIG. 3 according to this disclosure.
Figure 10:
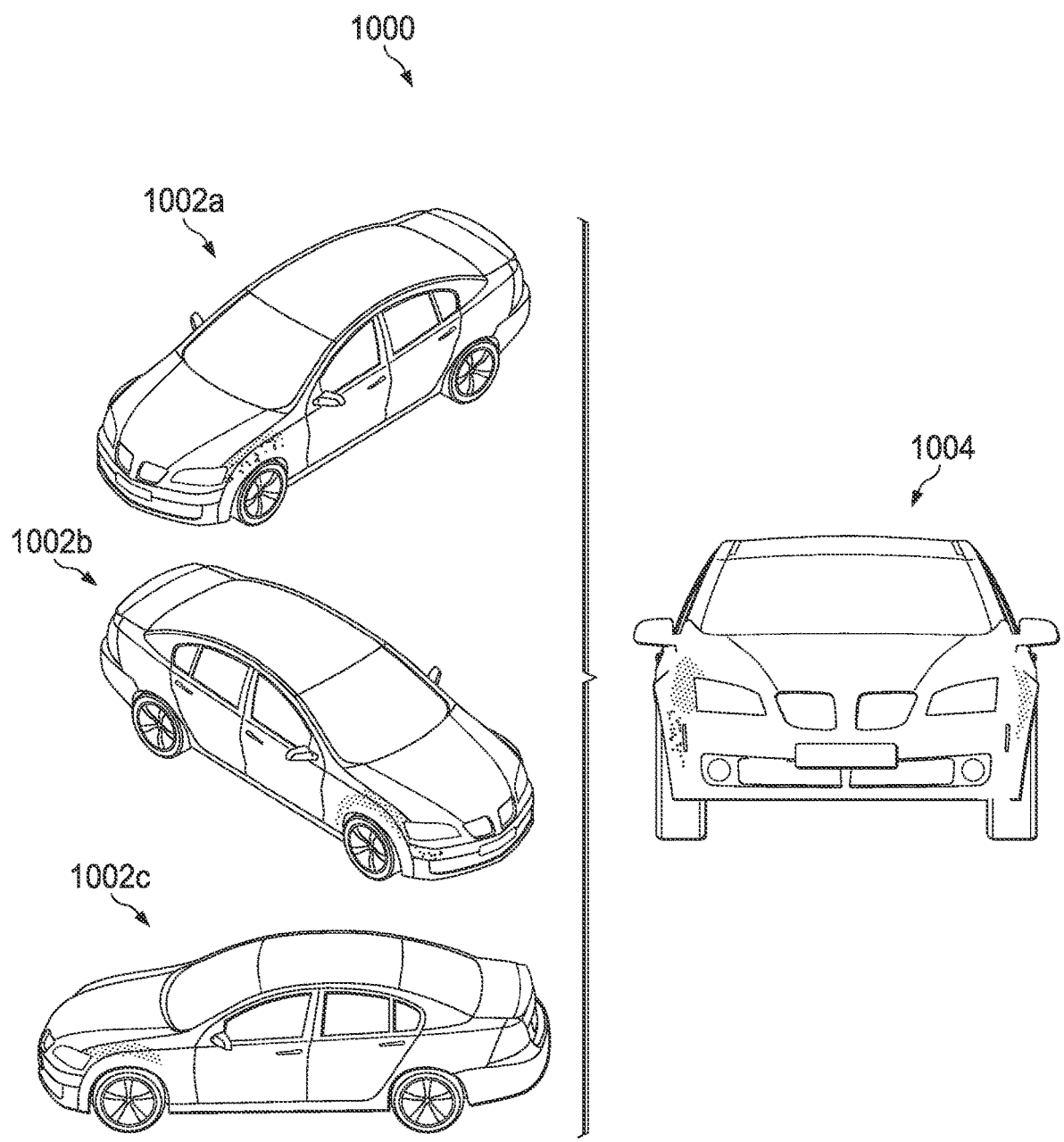

FIGS. 9 and 10 illustrate example damage marker mapping processes 900, 1000 in the functional architecture 300 of FIG. 3 according to this disclosure. Each of the damage marker mapping processes 900, 1000 shown in FIGS. 9 and 10 may, for example, represent a process that is performed by the damage marker mapping function 312 in the functional architecture 300 of FIG. 3. However, the damage marker mapping function 312 in the functional architecture 300 of FIG. 3 may be implemented in any other suitable manner, and the damage marker mapping processes 900, 1000 of FIGS. 9 and 10 may be used in any other suitable functional architecture.

As shown in FIG. 9, the damage marker mapping process 900 here involves the use of a damage marker mapping machine learning model 902. The machine learning model 902 can be trained as described above to map transformed damage markers onto a 3D vehicle model associated with a damaged vehicle. Here, one or more transformed damage markers 812 within a transformed output mask 810 and a 3D vehicle model 504 are obtained. In some embodiments, the one or more transformed damage markers 812 may be obtained using the damage marker morphing process 800, and the 3D vehicle model 504 may be obtained from the database 306 and given the orientation 508 as identified by the vehicle pose estimation process 500 or 600.

The damage marker mapping machine learning model 902 here operates to map the one or more transformed damage markers 812 onto the 3D vehicle model 504 in order to produce a final 3D vehicle model 904. One or more mapped damage markers 906 represent the one or more transformed damage markers 812 as mapped onto the final 3D vehicle model 904. Each mapped damage marker 906 can identify both the location and dimensions of a detected instance of damage to the vehicle. In some embodiments, the mapping of transformed damage markers 812 onto a 3D vehicle model 504 can occur by converting pixels within the one or more transformed damage markers 812 into virtual camera rays and determining where the virtual camera rays intersect with the outer surfaces of the 3D vehicle model 504. These intersection points can be used to define the locations of damage within a 3D space associated with the 3D vehicle model 904, thereby defining the one or more mapped damage markers 906.

In some embodiments, the final 3D vehicle model 904 may be presented to a user, such as via a graphical user interface. The user may view the final 3D vehicle model 904, rotate the 3D vehicle model 904 to view the 3D vehicle model 904 from different directions, and view the mapped damage markers 906 on the 3D vehicle model 904. In other embodiments, the final 3D vehicle model 904 may be used to estimate one or more repairs needed to the damaged vehicle and/or to estimate one or more costs associated with repairing the damaged vehicle. In general, the final 3D vehicle model 904 may be used in any suitable manner.

In some cases, there may be multiple input images 404 associated with the same damaged vehicle. This may be common, for instance, when it is not possible to capture all damage to the vehicle using a single image. In that case, the process 1000 as shown in FIG. 10 may be used. Here, the process 1000 may repeat the various operations described above in order to generate multiple intermediate 3D vehicle models 1002a-1002c, each of which may include one or more mapped damage markers. In this example, at least three input images 404 are processed in order to generate at least three intermediate 3D vehicle models 1002a-1002c. However, the number of input images 404 and the number of intermediate 3D vehicle models 1002a-1002c can vary from the numbers shown here. Because the input images 404 may be captured at different angles relative to the damaged vehicle, different intermediate 3D vehicle models 1002a-1002c may identify different damage markers identifying different instances of damage to the vehicle.

The damage marker mapping machine learning model 902 may then combine the various intermediate 3D vehicle models 1002a-1002c in order to produce a final 3D vehicle model 1004. The final 3D vehicle model 1004 can include all of the mapped damage markers that were mapped onto the intermediate 3D vehicle models 1002a-1002c. In some cases, the damage marker mapping machine learning model 902 may aggregate the mapped damage markers from the intermediate 3D vehicle models 1002a-1002c onto a single 3D vehicle model to produce the final 3D vehicle model 1004. The final 3D vehicle model 1004 may then be used in any suitable manner, such as in the various ways described above.

Although FIGS. 9 and 10 illustrate examples of damage marker mapping processes 900, 1000 in the functional architecture 300 of FIG. 3, various changes may be made to FIGS. 9 and 10. For example, the inputs and outputs shown here are for illustration only. The damage markers 812 and the 3D vehicle models 504 that are processed using the damage marker mapping processes 900, 1000 can vary widely. Thus, the outputs generated by the damage marker mapping processes 900, 1000 can vary widely depending on the damage markers 812 and the 3D vehicle models 504 being processed. Also, the use of a machine learning model is not necessarily required to implement the damage marker mapping process 900 or 1000.

Figure 11:
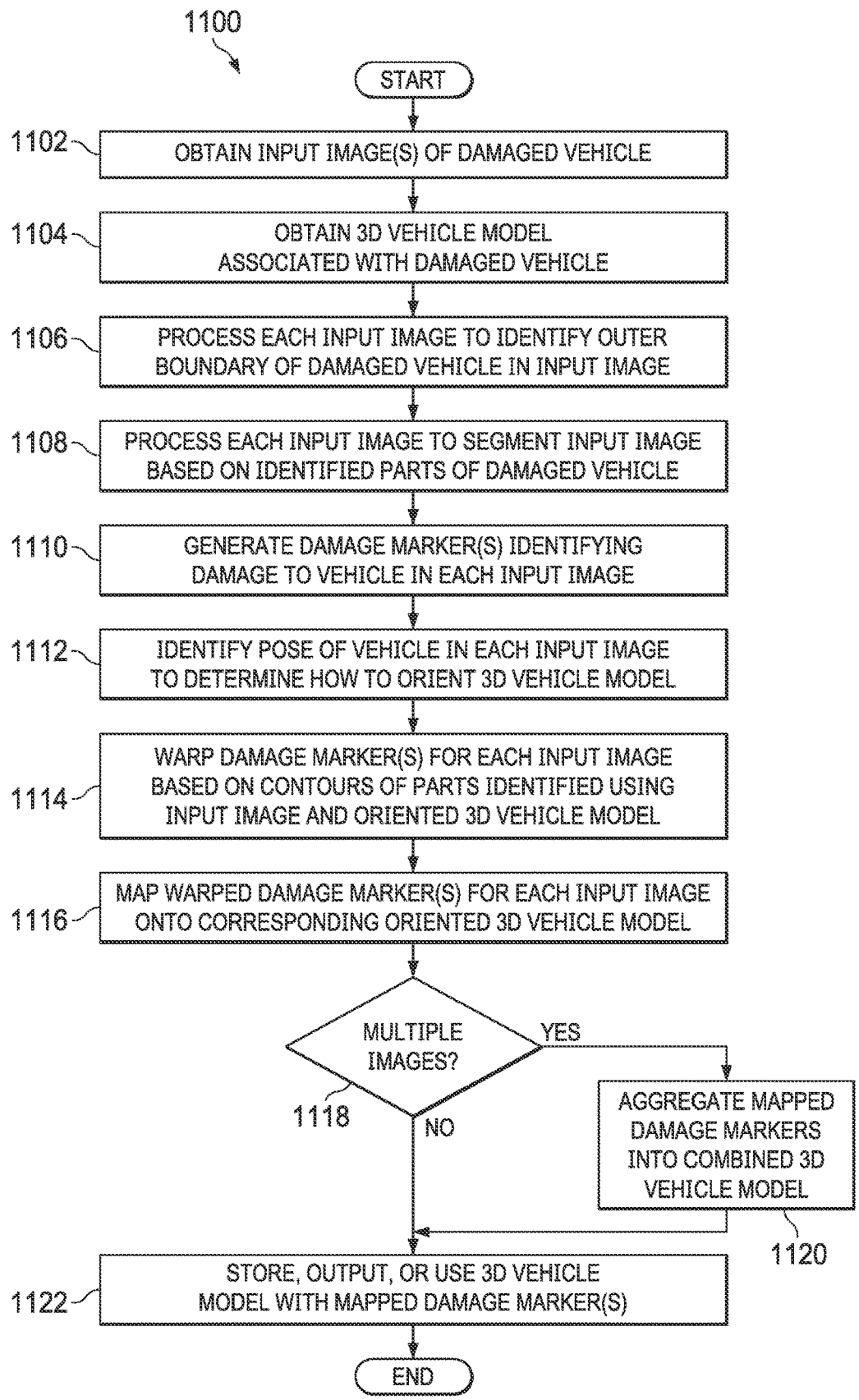
FIG. 11 illustrates an example method for transferring damage markers from images to 3D vehicle models for damage assessment according to this disclosure.

FIG. 11 illustrates an example method 1100 for transferring damage markers from images to 3D vehicle models for damage assessment according to this disclosure. For ease of explanation, the method 1100 shown in FIG. 11 is described as being performed within the system 100 of FIG. 1, which may use one or more instances of the device 200 of FIG. 2 to at least partially implement the functionality of the application server 106 of FIG. 1 and which may support the functional architecture 300 of FIG. 3. However, the method 1100 shown in FIG. 11 may be performed using any other suitable device and in any other suitable system.

As shown in FIG. 11, one or more images of a damaged vehicle are obtained at step 1102. This may include, for example, the application server 106 obtaining one or more input images 404 of a damaged vehicle. A 3D vehicle model associated with the damaged vehicle is obtained at step 1104. This may include, for example, the application server 106 obtaining a 3D vehicle model 504 associated with the damaged vehicle, such as from a database 110, 306 or other location.

Each input image is processed to identify an outer boundary of the damaged vehicle within the input image at step 1106. This may include, for example, the processing device 202 of the application server 106 identifying the outer boundary of the damaged vehicle in each input image 404, such as by using the damage and parts segmentation function 304. Each input image is processed to segment the input image based on different identified parts of the damaged vehicle at step 1108. This may include, for example, the processing device 202 of the application server 106 generating an output mask 406 for each input image 404, such as by using the damage and parts segmentation function 304. Each output mask 406 can identify different segmented portions 408 of the associated input image 404 that are associated with different parts of the damaged vehicle. One or more damage markers identifying damage to the vehicle are generated for each input image at step 1110. This may include, for example, the processing device 202 of the application server 106 generating an output mask 410 for each input image 404, such as by using the damage and parts segmentation function 304. Each output mask 410 can include one or more damage markers 412 associated with identified damage to the vehicle, and different damage markers 412 may identify different types of damage to the vehicle.

A pose of the damaged vehicle within each input image is identified in order to determine how the 3D vehicle model should be oriented to match or substantially match the damaged vehicle in the input image at step 1112. This may include, for example, the processing device 202 of the application server 106 determining, for each input image 404, how to rotate the 3D vehicle model 504 so that the 3D vehicle model 504 has the same or substantially the same orientation as the damaged vehicle in the input image 404, such as by using the vehicle pose estimation function 308. The one or more damage markers determined using each input image may be warped (if necessary) based on contours of one or more vehicle parts identified using the input image and contours of the same vehicle part(s) in the oriented 3D vehicle model at step 1114. This may include, for example, the processing device 202 of the application server 106 determining a warping function 806 that causes the contours of one or more vehicle parts as identified in the output mask 406 for each input image 404 to more closely match the contours of the same vehicle part(s) as identified in the 3D vehicle model 504 when oriented appropriately, such as by using the fine-morphing function 310. This may also include the processing device 202 of the application server 106 applying the warping function 806 associated with each input image 404 to the one or more damage markers 412 generated using that input image 404 to produce one or more warped or transformed damage markers 812.

The one or more warped or transformed damage markers associated with each input image are mapped onto the 3D vehicle model as oriented based on that input image at step 1116. This may include, for example, the processing device 202 of the application server 106 mapping the one or more warped or transformed damage markers 812 associated with each input image 404 onto the 3D vehicle model 504 when positioned in the same or substantially the same orientation as the vehicle in the input image 404, such as by using the damage marker mapping function 312. As a particular example, this may include the processing device 202 of the application server 106 determining where virtual camera rays associated with pixels in each transformed damage marker 812 would strike the outer surface of the oriented 3D vehicle model 504.

A determination is made whether multiple input images are being processed at step 1118. If not, the 3D vehicle model 504 mapped with the one or more transformed damage markers 812 may be used as a final 3D vehicle model 904 associated with the single input image 404. Otherwise, the mapped damage markers on different 3D vehicle models may be aggregated into a combined 3D vehicle model at step 1120. This may include, for example, the processing device 202 of the application server 106 aggregating or otherwise combining multiple intermediate 3D vehicle models 1002a-1002c in order to produce a final 3D vehicle model 1004 associated with the multiple input images 404, such as by using the damage marker mapping function 312.

The final 3D vehicle model with the one or more mapped damage makers can be stored, output, or used in some manner at step 1122. This may include, for example, the processing device 202 of the application server 106 generating a graphical user interface that includes the final 3D vehicle model 904, 1004 and that allows a user to rotate or manipulate the final 3D vehicle model 904, 1004, such as by using the GUI function 316. This may also or alternatively include the processing device 202 of the application server 106 identifying one or more vehicle parts (such as external and/or internal vehicle parts) that may need repair or replacement, identifying one or more repair operations needed to repair the damaged vehicle, and/or estimating one or more costs associated with repairing the damaged vehicle, such as by using the damage/repair estimation function 318. The final 3D vehicle model 904, 1004 with the one or more mapped damage makers 906 may be used in any other suitable manner.

Although FIG. 11 illustrates one example of a method 1100 for transferring damage markers from images to 3D vehicle models for damage assessment, various changes may be made to FIG. 11. For example, while shown as a series of steps, various steps in FIG. 11 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining an image of a damaged vehicle and a three-dimensional (3D) vehicle model associated with the damaged vehicle;
segmenting the image to identify different portions of the image that capture different parts of the damaged vehicle, wherein segmenting the image comprises generating a first mask associated with the image;
identifying one or more damage markers that indicate damage to the damaged vehicle based on the image, wherein identifying the one or more damage markers comprises generating a second mask associated with the image;
identifying a pose of the damaged vehicle within the image;
identifying differences between contours of at least one of the parts of the damaged vehicle as identified in the first mask and contours of the at least one of the parts as identified in the 3D vehicle model when oriented in the identified pose;
warping the one or more damage markers based on the identified differences to generate one or more transformed damage markers; and
mapping the one or more transformed damage markers onto the 3D vehicle model based on the identified pose, the one or more mapped damage markers identifying one or more locations and dimensions of the damage to the damaged vehicle on the 3D vehicle model.

2. The method of claim 1, wherein:
the first mask contains first values associated with at least some pixels of the image, the first values identifying which pixels of the image are associated with the different parts of the damaged vehicle; and
the second mask contains second values associated with a subset of the pixels, the second values identifying which pixels of the image are associated with the damage to the damaged vehicle.

3. The method of claim 2, wherein the pixels of the image that are associated with the damage to the damaged vehicle form the one or more damage markers.

4. The method of claim 1, wherein identifying the pose of the damaged vehicle within the image comprises:
selecting one or more parts of the damaged vehicle;
comparing a first embedding of a portion of the image containing the one or more selected parts to multiple second embeddings of the 3D vehicle model containing the one or more selected parts, different ones of the second embeddings associated with different poses of the 3D vehicle model; and
selecting one of the second embeddings that is most similar to the first embedding.

5. The method of claim 1, wherein:
the image comprises one of multiple images;
mapping the one or more transformed damage markers onto the 3D vehicle model comprises mapping one or more transformed damage markers associated with each image onto an intermediate 3D vehicle model associated with that image; and
the method further comprises aggregating the mapped damage markers associated with the intermediate 3D vehicle models to generate a final 3D vehicle model with mapped damage markers based on the multiple images.

6. The method of claim 1, further comprising at least one of:
generating a graphical user interface containing the 3D vehicle model with the one or more mapped damage markers;
identifying one or more parts of the damaged vehicle to be repaired or replaced based on the 3D vehicle model with the one or more mapped damage markers;
identifying one or more repair operations to be performed to the damaged vehicle based on the 3D vehicle model with the one or more mapped damage markers; and
estimating one or more costs for repairing the damaged vehicle based on the 3D vehicle model with the one or more mapped damage markers.

7. The method of claim 1, further comprising:
using one or more trained machine learning models to at least one of: identify the one or more damage markers, identify the pose of the damaged vehicle within the image, and map the one or more transformed damage markers onto the 3D vehicle model.

8. An apparatus comprising:
at least one processing device configured to:
obtain an image of a damaged vehicle and a three-dimensional (3D) vehicle model associated with the damaged vehicle;
segment the image to identify different portions of the image that capture different parts of the damaged vehicle, wherein, to segment the image, the at least one processing device is configured to generate a first mask associated with the image;
identify one or more damage markers that indicate damage to the damaged vehicle based on the image, wherein, to identify the one or more damage markers, the at least one processing device is configured to generate a second mask associated with the image;
identify a pose of the damaged vehicle within the image;
identify differences between contours of at least one of the parts of the damaged vehicle as identified in the first mask and contours of the at least one of the parts as identified in the 3D vehicle model when oriented in the identified pose;
warp the one or more damage markers based on the identified differences to generate one or more transformed damage markers; and
map the one or more transformed damage markers onto the 3D vehicle model based on the identified pose, the one or more mapped damage markers identifying one or more locations and dimensions of the damage to the damaged vehicle on the 3D vehicle model.

9. The apparatus of claim 8, wherein:
the first mask contains first values associated with at least some pixels of the image, the first values identifying which pixels of the image are associated with the different parts of the damaged vehicle; and
the second mask contains second values associated with a subset of the pixels, the second values identifying which pixels of the image are associated with the damage to the damaged vehicle.

10. The apparatus of claim 9, wherein the pixels of the image that are associated with the damage to the damaged vehicle form the one or more damage markers.

11. The apparatus of claim 8, wherein, to identify the pose of the damaged vehicle within the image, the at least one processing device is configured to:
select one or more parts of the damaged vehicle;
compare a first embedding of a portion of the image containing the one or more selected parts to multiple second embeddings of the 3D vehicle model containing the one or more selected parts, different ones of the second embeddings associated with different poses of the 3D vehicle model; and
select one of the second embeddings that is most similar to the first embedding.

12. The apparatus of claim 8, wherein:
the image comprises one of multiple images;
the at least one processing device is configured to map one or more transformed damage markers associated with each image onto an intermediate 3D vehicle model associated with that image; and
the at least one processing device is further configured to aggregate the mapped damage markers associated with the intermediate 3D vehicle models to generate a final 3D vehicle model with mapped damage markers based on the multiple images.

13. The apparatus of claim 8, wherein the at least one processing device is further configured to at least one of:
generate a graphical user interface containing the 3D vehicle model with the one or more mapped damage markers;
identify one or more parts of the damaged vehicle to be repaired or replaced based on the 3D vehicle model with the one or more mapped damage markers;
identify one or more repair operations to be performed to the damaged vehicle based on the 3D vehicle model with the one or more mapped damage markers; and
estimate one or more costs for repairing the damaged vehicle based on the 3D vehicle model with the one or more mapped damage markers.

14. The apparatus of claim 8, wherein the at least one processing device is further configured to use one or more trained machine learning models to at least one of: identify the one or more damage markers, identify the pose of the damaged vehicle within the image, and map the one or more transformed damage markers onto the 3D vehicle model.

15. A non-transitory machine-readable medium containing instructions that when executed cause at least one processor to:
obtain an image of a damaged vehicle and a three-dimensional (3D) vehicle model associated with the damaged vehicle;
segment the image to identify different portions of the image that capture different parts of the damaged vehicle, wherein the instructions that when executed cause the at least one processor to segment the image comprise instructions that when executed cause the at least one processor to generate a first mask associated with the image;
identify one or more damage markers that indicate damage to the damaged vehicle based on the image, wherein the instructions that when executed cause the at least one processor to identify the one or more damage markers comprise instructions that when executed cause the at least one processor to generate a second mask associated with the image;
identify a pose of the damaged vehicle within the image;
identify differences between contours of at least one of the parts of the damaged vehicle as identified in the first mask and contours of the at least one of the parts as identified in the 3D vehicle model when oriented in the identified pose;
warp the one or more damage markers based on the identified differences to generate one or more transformed damage markers; and
map the one or more transformed damage markers onto the 3D vehicle model based on the identified pose, the one or more mapped damage markers identifying one or more locations and dimensions of the damage to the damaged vehicle on the 3D vehicle model.

16. The non-transitory machine-readable medium of claim 15, wherein:
the first mask contains first values associated with at least some pixels of the image, the first values identifying which pixels of the image are associated with the different parts of the damaged vehicle; and
the second mask contains second values associated with a subset of the pixels, the second values identifying which pixels of the image are associated with the damage to the damaged vehicle.

17. The non-transitory machine-readable medium of claim 16, wherein the pixels of the image that are associated with the damage to the damaged vehicle form the one or more damage markers.

18. The non-transitory machine-readable medium of claim 15, wherein the instructions that when executed cause the at least one processor to identify the pose of the damaged vehicle within the image comprise instructions that when executed cause the at least one processor to:
select one or more parts of the damaged vehicle;
compare a first embedding of a portion of the image containing the one or more selected parts to multiple second embeddings of the 3D vehicle model containing the one or more selected parts, different ones of the second embeddings associated with different poses of the 3D vehicle model; and
select one of the second embeddings that is most similar to the first embedding.

19. The non-transitory machine-readable medium of claim 15, wherein:
the image comprises one of multiple images;
the instructions when executed cause the at least one processor to map one or more transformed damage markers associated with each image onto an intermediate 3D vehicle model associated with that image; and
the medium further contains instructions that when executed cause the at least one processor to aggregate the mapped damage markers associated with the intermediate 3D vehicle models to generate a final 3D vehicle model with mapped damage markers based on the multiple images.

20. The non-transitory machine-readable medium of claim 15, further containing instructions that when executed cause the at least one processor to at least one of:
generate a graphical user interface containing the 3D vehicle model with the one or more mapped damage markers;
identify one or more parts of the damaged vehicle to be repaired or replaced based on the 3D vehicle model with the one or more mapped damage markers;
identify one or more repair operations to be performed to the damaged vehicle based on the 3D vehicle model with the one or more mapped damage markers; and
estimate one or more costs for repairing the damaged vehicle based on the 3D vehicle model with the one or more mapped damage markers.

* * * * *